United States Patent
Oh et al.

(10) Patent No.: US 8,428,654 B2
(45) Date of Patent: Apr. 23, 2013

(54) MOBILE TERMINAL AND METHOD FOR DISPLAYING MENU THEREOF

(75) Inventors: You-Hwa Oh, Seoul (KR); Ik-Hoon Kim, Seoul (KR); Kyoung-Jin Jo, Gyeonggi-Do (KR); Jae-Do Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 12/470,421

(22) Filed: May 21, 2009

(65) Prior Publication Data
US 2010/0009719 A1 Jan. 14, 2010

(30) Foreign Application Priority Data
Jul. 14, 2008 (KR) ........................ 10-2008-0068334

(51) Int. Cl.
*H04M 1/00* (2006.01)
(52) U.S. Cl.
USPC ..................... 455/563; 455/414.1; 455/414.4; 700/94; 704/201
(58) Field of Classification Search .................. 455/466, 455/417, 413, 445, 575.1, 414.4, 411, 518, 455/563, 564; 370/352; 379/211.02, 433.07, 379/221.08, 88.22, 211.01; 381/423; 700/94; 704/201; 707/E17.119
See application file for complete search history.

(56) References Cited

U.S. PATENT DOCUMENTS

| 6,341,372 | B1 * | 1/2002 | Datig ........................... 717/136 |
| 6,567,778 | B1 * | 5/2003 | Chao Chang et al. ........ 704/257 |
| 6,795,808 | B1 * | 9/2004 | Strubbe et al. ................ 704/275 |
| 6,981,023 | B1 * | 12/2005 | Hamilton et al. ............. 709/206 |
| 7,447,635 | B1 * | 11/2008 | Konopka et al. ............. 704/275 |
| 7,519,359 | B2 * | 4/2009 | Chiarulli et al. ............. 455/418 |
| 2003/0078766 | A1 * | 4/2003 | Appelt et al. ..................... 704/9 |
| 2006/0098085 | A1 | 5/2006 | Nichols et al. |
| 2006/0178159 | A1 | 8/2006 | Timms et al. |
| 2006/0193448 | A1 | 8/2006 | Donoghue et al. |
| 2007/0026852 | A1 * | 2/2007 | Logan et al. ............... 455/422.1 |
| 2007/0249406 | A1 | 10/2007 | Andreasson |
| 2008/0153465 | A1 * | 6/2008 | Evermann et al. ......... 455/414.1 |

FOREIGN PATENT DOCUMENTS

| EP | 1478178 | 11/2004 |
| WO | 2005/096647 | 10/2005 |

* cited by examiner

*Primary Examiner* — Mahendra Patel
(74) *Attorney, Agent, or Firm* — Lee, Hong, Degerman, Kang & Waimey

(57) ABSTRACT

Disclosed is a method for automatically displaying a menu relating to a specific function by recognizing a user's voice command in a call mode, and for directly executing the menu, and a mobile terminal having the same. A mobile terminal may include a microphone configured to receive a user's voice in a video call mode, a display for displaying information, and a controller configured to recognize the voice, detect a voice command included in the voice, and automatically display a menu corresponding to the detected voice command on the display.

14 Claims, 19 Drawing Sheets

MOBILE TERMINAL AND METHOD FOR DISPLAYING MENU THEREOF

CROSS REFERENCE TO RELATED APPLICATIONS

Pursuant to 35 U.S.C. §119(a), this application claims the benefit of earlier filing date and right of priority to Korean Application No. 10-2008-0068334, filed on Jul. 14, 2008, which is herein expressly incorporated by reference in its entirety.

BACKGROUND OF THE INVENTION

1. Field of the Invention

The present invention relates to a mobile terminal and method for automatically displaying a menu relating to a specific function by recognizing a user's voice command in a call mode, and for executing the menu.

2. Background of the Invention

Mobile terminals may be configured to perform various functions, for example, data and voice communication, capturing images or video using a camera, storing voice, reproducing music files via a speaker system, displaying images or video and the like. Some mobile terminals may include additional functions for playing games, and other mobile terminals may be implemented as multimedia players. In addition, in recent times, mobile terminals can receive broadcast or multicast signals to allow viewing of video or television programs.

Generally, terminals are divided into mobile terminals and stationary terminals according to a portable state. The mobile terminals are divided into handheld terminals and vehicle mounted terminals according to a direct portable characteristic.

Many efforts to support and enhance functions of the mobile terminals are currently ongoing, not only in the aspect of structural configuration changes, but also in the aspect of software or hardware changes.

However, a conventional mobile terminal has the following problems. Firstly, when a voice call or a video call is to be performed by using the mobile terminal, a user can not share specific information such as text or music with a party to the call. Secondly, specific functions of the mobile terminal cannot be executed for use in the call.

SUMMARY OF THE INVENTION

Therefore, an object of the present invention is to provide a method for displaying a menu of a mobile terminal, capable of automatically displaying a menu relating to a specific function by recognizing a user's voice command in a call mode, and for directly executing the menu, and a mobile terminal having the same.

Another object of the present invention is to provide a method for displaying a menu of a mobile terminal, capable of detecting a voice keyword relating to a specific function included in call content in a voice call mode or a video call mode, and capable of automatically displaying or executing a menu corresponding to the voice keyword, and a mobile terminal having the same.

Still another object of the present invention is to provide a method for displaying a menu of a mobile terminal, capable of executing a specific function through a voice command included in call content in a voice call mode or a video call mode, and capable of sharing specific information relating to the specific function with a party to the call, and a mobile terminal having the same.

To achieve these and other advantages and in accordance with the purpose of the present invention, as embodied and broadly described herein, there is provided a mobile terminal including a microphone configured to receive a user's voice during a video call, a display for displaying information, and a controller configured to recognize the voice, detect a voice command included in the voice, and automatically display a menu corresponding to the detected voice command on the display.

There is also provided a method for displaying a menu of a mobile terminal, including detecting a voice command of a user included in call content during a video call, and automatically displaying a menu corresponding to the voice command.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
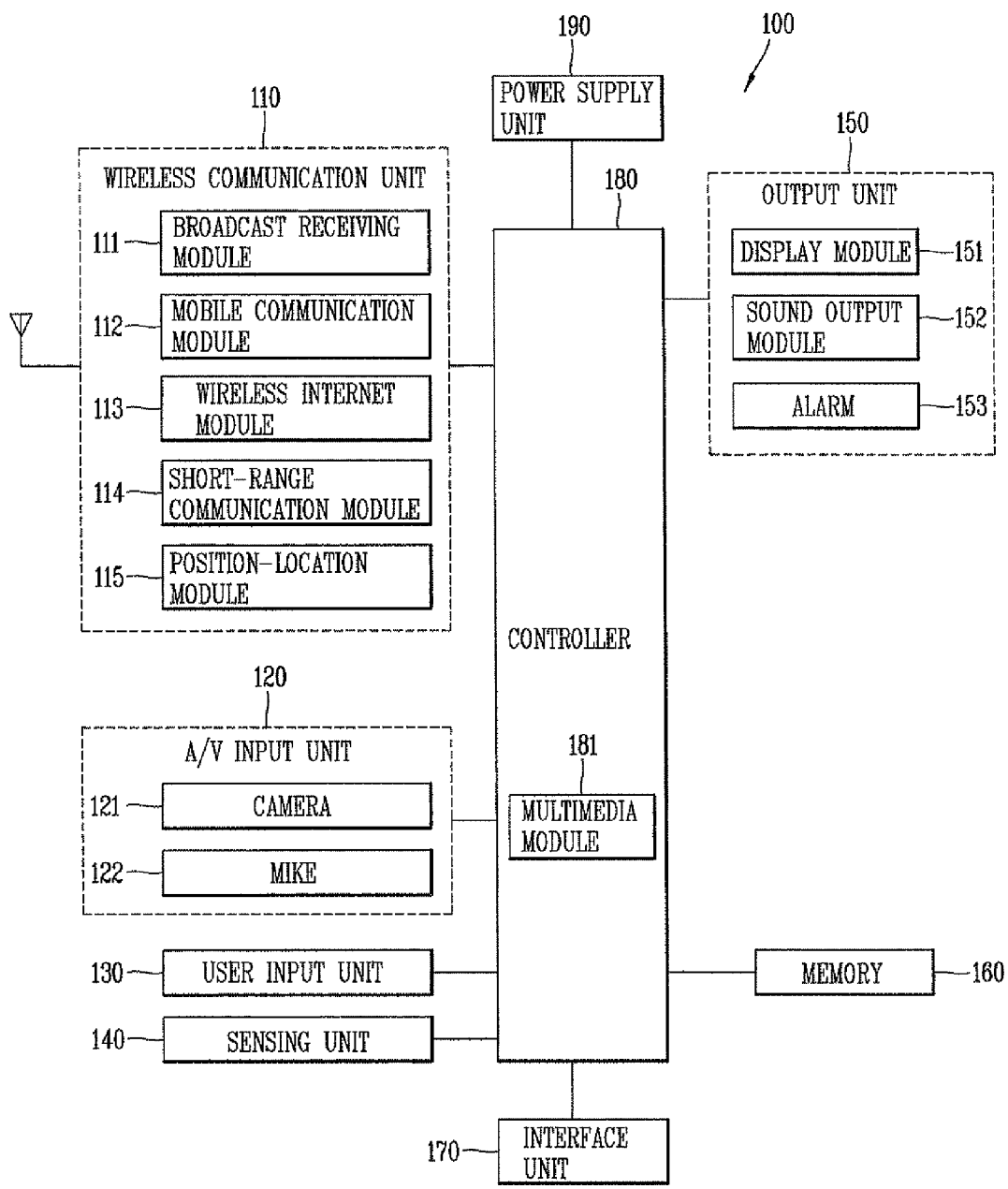
FIG. 1 is a block diagram showing a mobile terminal according to an embodiment of the present invention.

Description will now be given in detail of various embodiments according to the present invention, with reference to the accompanying drawings. However, known technologies that may obscure the concept of the present invention and a detailed description of their configurations will be omitted. Also, for the explanation of the present invention with reference to the drawings, components performing same functions will be represented by the same reference numerals.

Hereinafter, the terms 'module' and 'portion or unit' are provided just for convenience in disclosing the detailed description, and thus the terms may be substituted by each other with the same meaning.

Terminals may be configured in various types. The terminals of the present invention are classified into mobile terminals such as portable terminals, smart phones, notebook computers, terminals for Digital Multimedia Broadcasting (DMB), Personal Digital Assistants (PDA), Portable Multimedia Players (PMP) and navigation, and stationary terminals such as digital TVs and desk top computers. Hereinafter, it is assumed that the mobile terminals are applied to the present invention. However, the terminals of the present invention may be also applied to the stationary terminals, except for specific portions configured for portability.

Hereinafter, a mobile terminal according to embodiments of the present invention will be described in more detail with reference to drawings.

FIG. 1 is a block diagram illustrating a mobile terminal according to one embodiment of the present invention. The mobile terminal 100 may comprise components such as a wireless communication unit 110, an Audio/Video (A/V) input unit 120, a user input unit 130, a sensing unit 140, an output unit 150, a memory 160, an interface unit 170, a controller 180, a power supply 190 and the like.

FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless internet module 113, a short-range communication module 114 and a position location module 115.

The broadcast receiving module 111 receives a broadcast signal and/or broadcast associated information from an external broadcast managing server via a broadcast channel. The broadcast channel may include a satellite channel and a terrestrial channel. The broadcast managing server may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal.

The short-range communication module 114 denotes a module for short-range communications. Suitable technologies for implementing this module may include BLUETOOTH, Radio Frequency Identification (RFID), Infrared Data Association (IrDA), Ultra-WideBand (UWB), ZigBee, and the like.

The position location module 115 denotes a module for detecting or calculating a position of a mobile terminal. An example of the position location module 115 may include a Global Position System (GPS) module. The GPS module may receive position information in cooperation with associated multiple satellites. Here, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 may detect a current state of the mobile terminal, such as an open/close status of the mobile terminal 100, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

The output unit 150 is configured to output an audio signal, a video signal or an alarm signal. The output unit 150 may include the display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call. As another example, if the mobile terminal 100 is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using at least one of, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. The mobile terminal 100 may include two or more of such displays 151 according to its embodiment. For example, the mobile terminal 100 may simultaneously include an external display (not shown) and an internal display (not shown).

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm 153 may output a signal to inform a generation of event associated with the mobile terminal 100. Typical events may include call received, message received, user input received and the like. In addition to generating the audio or video signal, the alarm 153 may also output a signal to inform the event generation in different manners for example, by providing tactile sensations (e.g., vibration) to a user.

The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be outputted via the display 151 or the audio output module 152.

The memory 160 may store a program for the processing and control of the controller 180. Alternatively, the memory 160 may temporarily store input/output data (e.g., phonebook data, messages, still images, video and the like).

The memory 160 may be implemented using any type of suitable storage medium including a flash memory type, a hard disk type, a multimedia card micro type, a memory card type (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal. For example, the controller 180 performs the control and processing associated with voice calls, data communications, video calls, and the like. The controller 180 may include a multimedia module 181 which provides multimedia playback. The multimedia module 181 may be configured as part of the controller 180 or as a separate component.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

As mentioned above, the internal components of the mobile terminal related to the present invention have been described from the perspective of their functions. Hereinafter, external components of the mobile terminal related to the present invention will be described from the perspective of their functions with reference to FIGS. 2 and 3. The mobile terminal may be implemented in a variety of different configurations. Examples of such configurations include folder type, bar type, swing type, slide type or the like. For the sake of brief explanation, further disclosure will primarily relate to a slide-type mobile terminal. However, the present invention may not be limited to the slide-type mobile terminal, but can be applied to other types of terminals including the aforesaid types of terminals.

Figure 2:
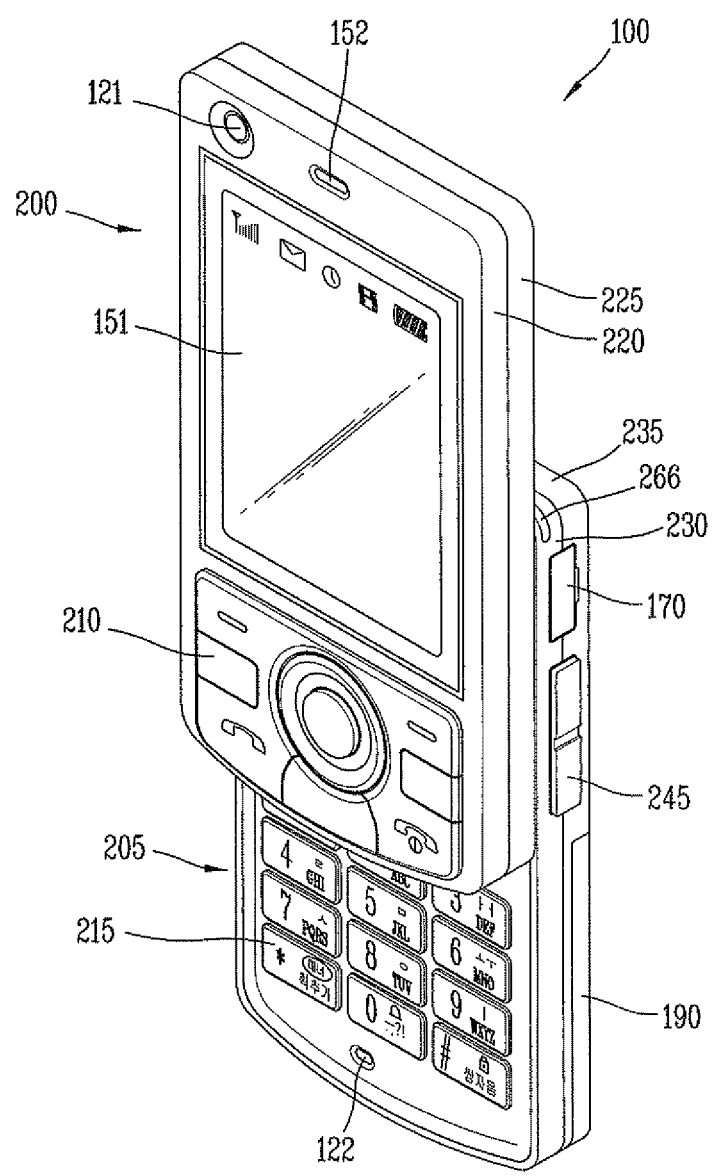
FIG. 2 is a perspective view of a front side of an exemplary mobile terminal according to an embodiment of the present invention.

FIG. 2 is a front perspective view of a mobile terminal in accordance with one embodiment of the present invention.

The mobile terminal 100 of the present invention may comprise a first body 200, and a second body 205 configured to slidably cooperate with the first body 200 in at least one direction.

The first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position).

The mobile terminal may be operable in a standby (idle) mode when in the closed configuration, but this mode can be released by the user's manipulation. Also, the mobile terminal may typically be operable in an active (phone call) mode in the open configuration. Here, this mode may be changed into the idle mode according to the user's manipulation or after a certain time elapses.

A case (housing, casing, cover, etc.) forming the outside of the first body 200 is formed by a first front case 220 and a first rear case 225. Various electronic components may be disposed in a space between the first front case 220 and the first rear case 225. One or more intermediate cases may additionally be disposed between the first front case 220 and the first rear case 225.

The cases can be formed of resin in a manner of injection molding, or formed using metallic materials such as stainless steel (STS) and titanium (Ti).

A display 151, an audio output module 152, a camera 121 or a first user input unit 210 may be disposed at the first front case 220 of the first body 200.

The display 151 may include LCD, OLED, and the like, which can visibly display information.

The display 151 and a touchpad can be layered with each other such that the display 151 can be configured to function as a touch screen so as to allow a user to input information in a touching manner.

The audio output module 152 may be implemented as a speaker.

The camera 121 may be implemented to be suitable for a user to capture still images or video.

Like the first body 200, a case configuring the outside of the second body 205 may be formed by a second front case 230 and a second rear case 235.

The second user input unit 215 may be disposed at the second body 205, in detail, at a front face of the second front case 230.

A third user input unit 245, a microphone 122 and an interface unit 170 may be disposed either at the second front case 230 or at the second rear case 235.

The first to third user input units 210, 215 and 245 may be named as a user input unit 130. Any tactile manner that a user can touch, e.g., the display 151, for manipulation can be employed for the user input unit 130.

For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 is used for inputting commands such as START, END, SCROLL or the like, and the second user input unit 215 is used for inputting numbers, characters, symbols, or the like.

Also, the third user input unit 245 can be operated as a hot key for activating a specific function within the mobile terminal.

The microphone 122 may be implemented to be suitable for receiving user's voice or various sounds.

The interface unit 170 may be used as a passage through which the terminal related to the present invention can exchange data or the like with an external device. For example, the interface unit 170 may be implemented as at least one of a wired/wireless connection port for connecting an earphone to the mobile terminal, a port for short-range communications (e.g., an Infrared Data Association (IrDA) port, a Bluetooth port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like.

The power supply 190 may be disposed at a side of the second rear case 235 to provide power to the mobile terminal. The power supply 190 may be a rechargeable battery, for example, to be attachable/detachable for charging.

Figure 3:
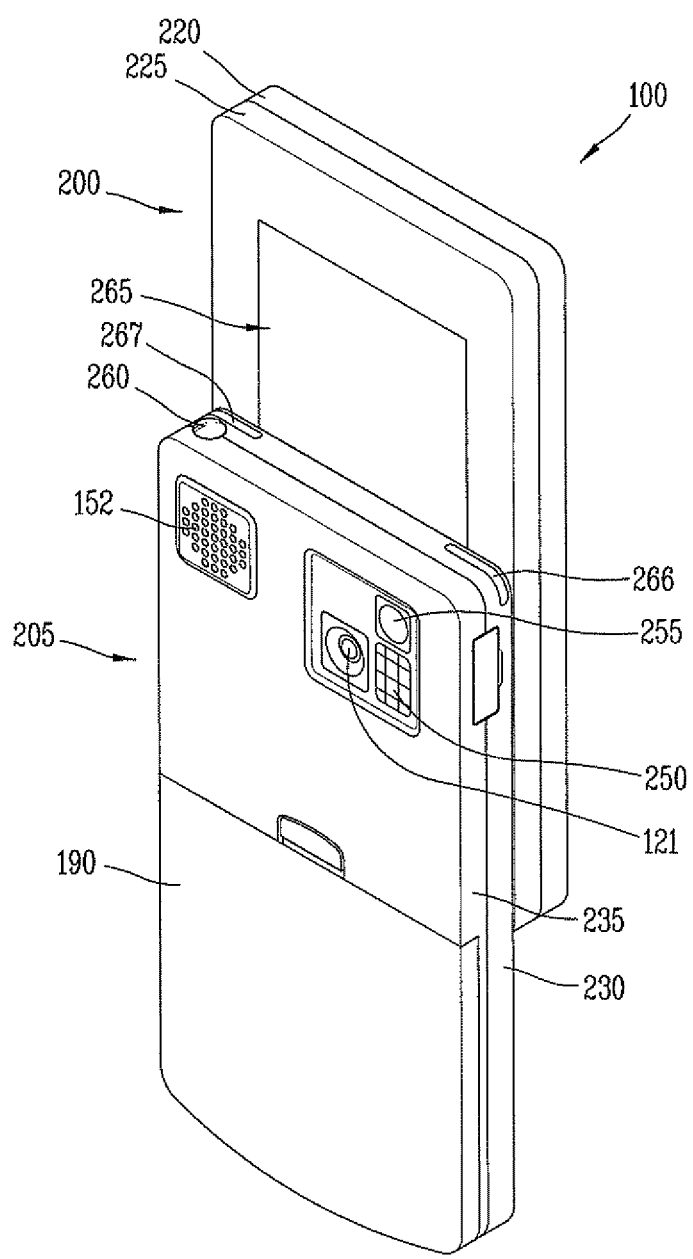
FIG. 3 is a rear view of the mobile terminal shown in FIG. 2.

FIG. 3 is a rear view of the mobile terminal according to the one embodiment of the present invention.

As illustrated in FIG. 3, a camera 121 may further be disposed at a rear face of the second rear case 235 of the second body 205. The camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to a party to the call in a video call mode or the like. On the other hand, the camera 121 of the second body 205 may operate with a relatively higher pixels (higher resolution) such that it can be useful for a user to obtain higher quality pictures for later use.

A flash 250 and a mirror 255 may additionally be disposed adjacent to the camera 121 of the second body 205. The flash 250 operates in conjunction with the camera 121 of the second body 250 when taking a picture using the camera 121 of the second body 205. The mirror 255 can cooperate with the camera 121 of the second body 205 to allow a user to photograph himself in a self-portrait mode.

The second rear case 235 may further include an audio output module 152.

The audio output module 152 of the second body 205 can cooperate with the audio output module 152 of the first body 200 to provide stereo output. Also, the audio output module 152 may be configured to operate as a speakerphone.

A broadcast signal receiving antenna 260 may be disposed at one side of the second rear case 235, in addition to an antenna for communications. The antenna 260 can be configured to retract into the second body 205.

One part of a slide module 265 which allows the first body 200 to be slidably coupled to the second body 205 may be disposed at the first rear case 225 of the first body 200.

The other part of the slide module 265 may be disposed at the second front case 230 of the second body 205, such that it may not be exposed to the exterior as illustrated in the drawing of the present invention.

As such, it has been described that the second camera 121, and the like are disposed at the second body 205; however, the present invention may not be limited to the configuration.

For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may be configured to operate within a communication system which transmits data via frames or packets, including both wireless and wireline communication systems, and satellite-based communication systems.

Hereinafter, a communication system within which the mobile terminal related to the present invention can operate will be described with reference to FIG. 4.

Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
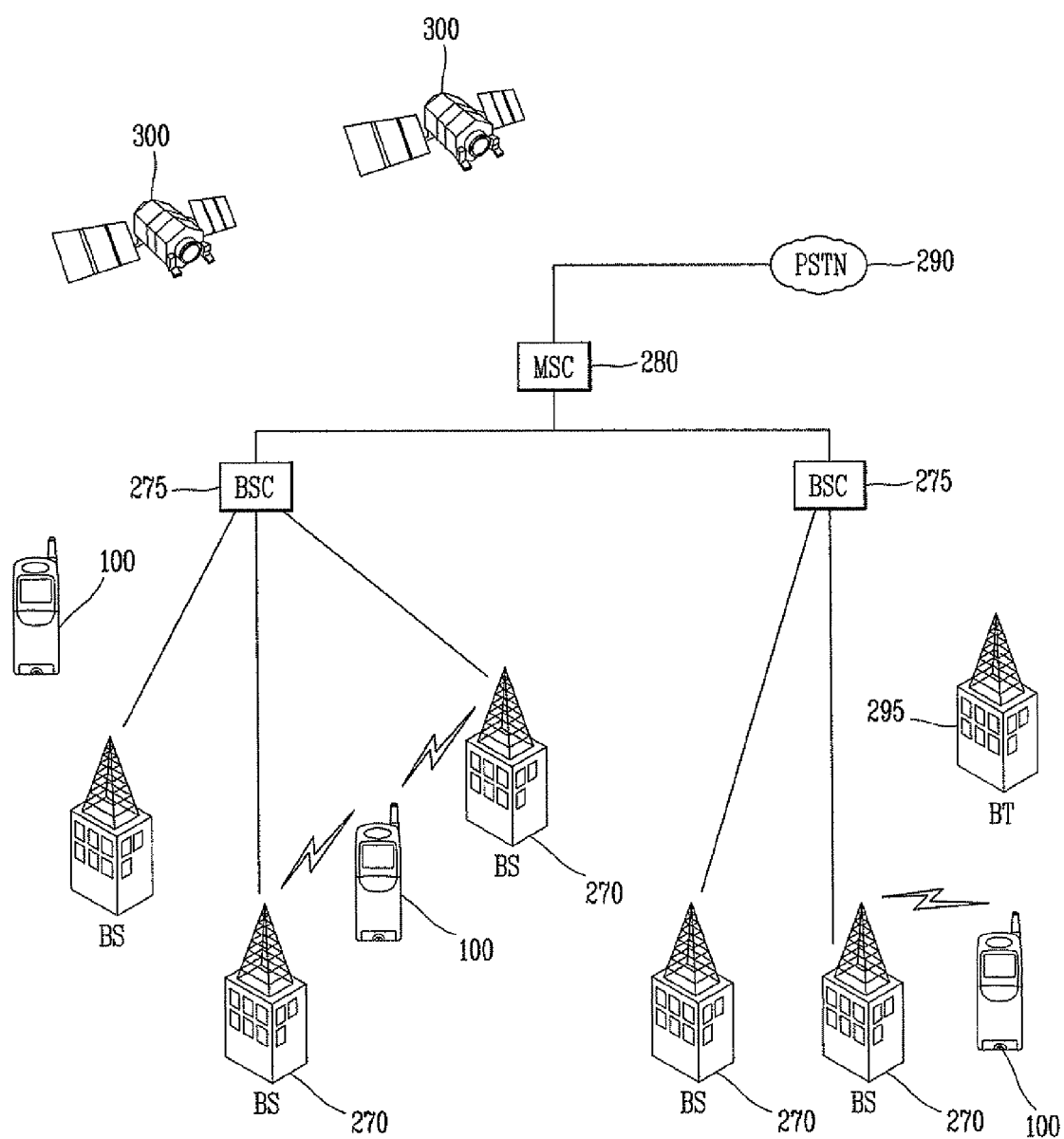
FIG. 4 is an exemplary view of a communication system operable with a mobile terminal according to the present invention.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switched Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, EL/T1,ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 4, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 4 further depicts Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

The mobile terminal according to certain embodiments of the present invention is configured such that an algorithm for a voice recognition and an algorithm for Speech To Text (STT) are stored in the memory 160. A particular function provided in the mobile terminal, the voice recognition function and the STT function may all cooperate together so as to convert voice that a user wants to input into a text format. Such converted text may be output on an execution screen associated with those functions. Here, the particular function may include a function of generating text such as text messages or electronic mail. In cooperation with the execution of the particular function, the controller 180 may activate the voice recognition function and automatically execute the STT function.

Figure 5:
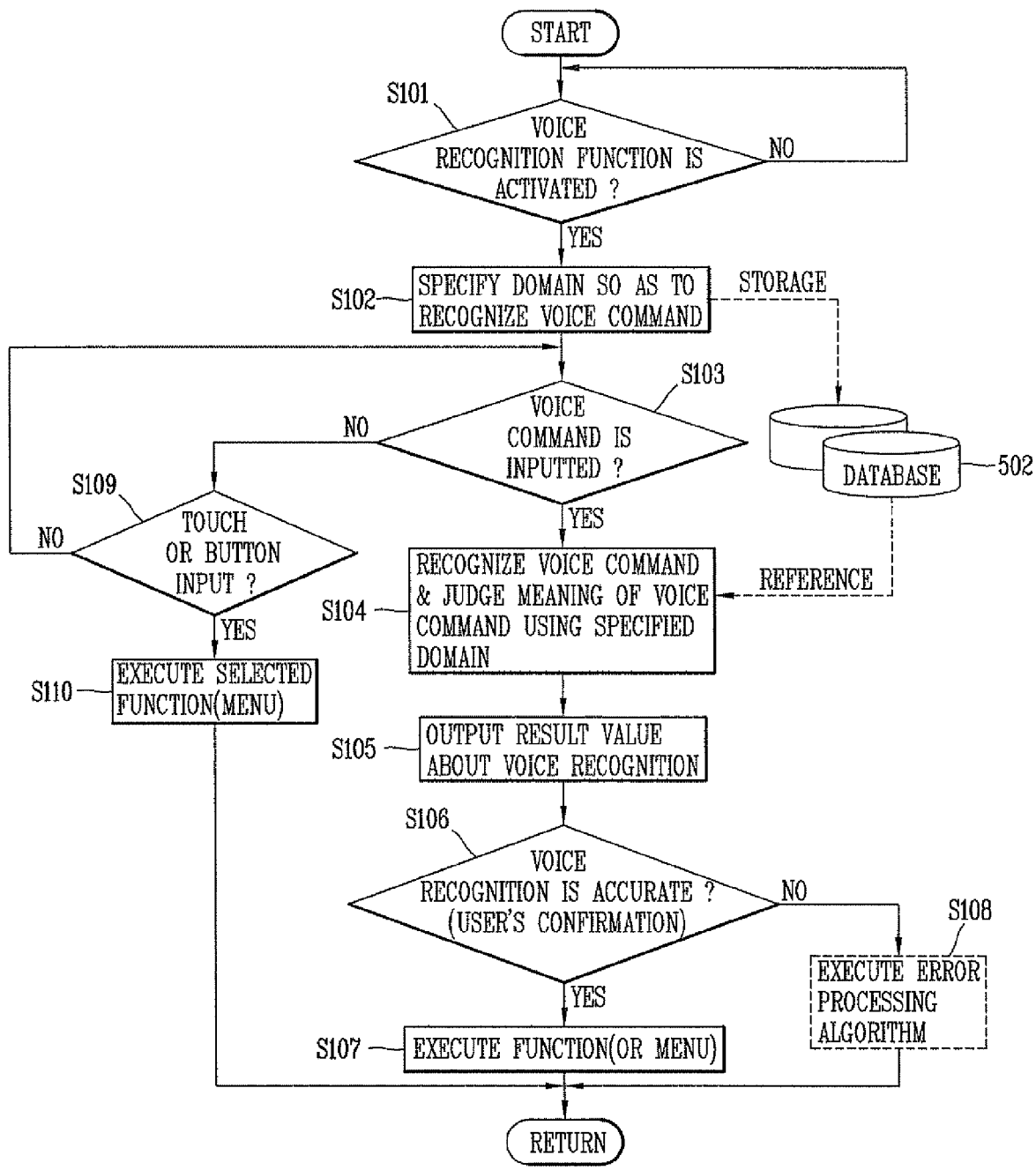
FIG. 5 is a flowchart of one example illustrating a menu controlling method using voice of a mobile terminal according to an embodiment of the present invention.

FIG. 5 is a flowchart showing a method for menu control through a voice command in a mobile terminal according to an embodiment of the present invention.

Initially, as shown in FIG. 5, the controller 180 may determine whether the voice recognition function has been activated (S101). The voice recognition function may be activated, for example, by the user selecting hardware buttons on the mobile terminal, or soft touch buttons displayed on the display module 151. The user may also activate the voice recognition function by manipulating specific menus displayed on the display 151.

The voice recognition function may also be activated by the user generating a specific sound or sound effects, by short or long-range wireless signals, by the user's body information such as hand gesture or body gesture, or by other means.

The specific sound or sound effects may include impact sounds having a level greater than a specified level. Further, the specific sound or sound effects may simply be detected using a sound level detecting algorithm. In addition, the sound level detecting algorithm is preferably simpler than a voice recognition algorithm, and thus may consume less resources of the mobile terminal. Also, the sound level detecting algorithm (or circuit) may be individually implemented separately from the voice recognition algorithm or circuit, it may be implemented together with or a part of the voice recognition algorithm or circuit, or it may be implemented so as to specify some functions of the voice recognition algorithm.

In addition, the wireless signals may be received through the wireless communication unit 110 (FIG. 1), and the user's hand or body gestures may be received through the sensing unit 140. Thus, in an embodiment, the wireless communication unit 110, the user input unit 130, and the sensing unit 140 may collectively be referred to as a signal input unit. Further, the voice recognition function may also be terminated in a similar manner.

In an embodiment, the activation of the voice recognition function is performed by a physical manipulation of a button on the terminal rather than activating the voice recognition function by speaking into the terminal. Having the user physically activate the voice recognition function, as in this embodiment, enables the user to focus on the fact that the user is about to use voice commands to control the terminal. That is, because the user has to first perform a physical manipulation of the terminal, the user may intuitively recognize that he or she is about to input a voice command or instruction into the terminal. As a result, the user may consciously speak more clearly or slowly to thereby activate a particular function. Thus, because the user speaks more clearly or more slowly, for example, the probability of accurately recognizing the voice instruction according to this embodiment may increase.

In an embodiment, the user may select how the controller 180 is to activate the voice recognition function using an appropriate menu option. The controller 180 may start or terminate activation of the voice recognition function based on criteria such as how many times the user touches a particular button or portion of the touch screen, how long the user touches a particular button or portion of the touch screen, etc. The user can select a menu option on the terminal that includes any of (1) setting activation of voice recognition based on X number of times the voice activation button is selected, (2) setting activation of voice recognition based on X amount of time the voice activation button is selected, (3) setting activation of voice recognition when the buttons X and Y are selected, etc. The user may also enter the values of X and Y in order to variably set how the controller 180 determines the voice activation function is activated. According to this embodiment, the user is actively engaged with the voice activation function of the mobile terminal. The user's familiarity promotes greater reliability in using the voice function. This embodiment also provides user flexibility by allowing the user to tailor the voice activation function according to his or her needs.

In other embodiments, the controller 180 may also maintain the activated state of the voice recognition function while the designated button(s) are touched or selected, and terminate the voice recognition function when the designated button(s) are released. Alternatively, the controller 180 may maintain the activation of the voice recognition function for a predetermined time period after the designated button(s) are touched or selected, and terminate the voice recognition function when the predetermined time period ends. In yet another embodiment, the controller 180 can store received voice instructions in the memory 160 while the voice recognition function is maintained in the activated state.

Referring back to FIG. 5, a domain of the database may be used as a reference for recognizing the meaning of the voice command. This domain may be specified as information relating or corresponding to specific functions or menus on the terminal (S102). For instance, the specified domain of the database may be information relating to menus currently displayed on the display 151, or information relating to sub-menus of one of the displayed menus. In embodiments where the domain of the database is specified, the recognition rate for the input voice command may be improved. Examples of domains include an e-mail domain, a received calls domain, and multimedia domain, etc.

The information relating to sub-menus may be configured as data in a database 502. For example, the information may be configured in the form of a keyword, and a plurality of information may correspond to one function or menu. In addition, the database can be configured as a plurality of databases and organized according to features of information or using some other criteria, and may be stored in the memory 160.

In an embodiment, the information in the database(s) 502 may be updated or renewed through a learning process. Each domain of the respective databases may also be specified as part of another domain relating to functions or menus being currently output, so as to enhance a recognition rate for a voice command. The domain may also change as menu steps continue to progress.

Once the voice recognition function is activated (Yes in S101) and the domain has been specified (S102), the controller 180 may determine whether the user has input a voice command (S103). When the controller 180 determines the user has input a voice command input through the microphone 122 or otherwise (Yes in S103), the controller 180 may analyze a context and content of the voice command or instruction based on a specific database 502 (e.g., a database corresponding to the specified domain), thereby judging a meaning of the voice command (S104).

In an embodiment, the controller 180 can determine the meaning of the voice instruction or command based on a language model and an acoustic model of the specified domain. The language model relates to the words themselves and the acoustic model corresponds to the way the words are spoken (e.g., frequency components of the spoken words or phrases). Using the language and acoustic models together with a specific domain and a state of the mobile terminal 100, the controller 180 can effectively determine the meaning of the input voice instructions or command.

In an embodiment, after the controller 180 activates the voice recognition function (S101) and after the input voice command is input and stored in the memory 160, the controller 180 may immediately start the process for judging the meaning of the input voice command (S103). In an alternative embodiment, the controller 180 may simultaneously perform the voice activation function while the voice command is being input.

If the voice command has not been fully input (No in S103), the controller 180 may still perform other functions. For example, if the user performs another action by touching a menu option, etc. or presses a button on the terminal (Yes in S109), the controller 180 may perform the corresponding selected function (S110).

Further, after the controller 180 determines the meaning of the input voice command in step S104, the controller 180 may output a result value of the meaning (S105). The result value may include control signals for executing menus relating to functions or services corresponding to the determined meaning, for controlling specific components of the mobile terminal, and the like. The result value may also include data for displaying information relating to the recognized voice command.

The controller 180 may also request the user confirm that the output result value is accurate (S106). For instance, when the voice command has a low recognition rate or is determined to have a plurality of meanings, the controller 180 may output a plurality of menus relating to the respective meanings and then execute a menu selected by the user (S107). Also, the controller 180 may perform steps to query a user whether to execute a specific menu having a high recognition rate, and then execute or display a corresponding function or menu according to the user's selection or response (S 108).

In an embodiment, the controller 180 may also output a voice message asking the user to select a particular menu or option such as "Do you want to execute a message composing function? Reply with Yes or No." Then, the controller 180 executes or does not execute a function corresponding to the particular menu or option based on the user's response. If the user does not respond in a particular time period (e.g., five seconds), the controller 180 can also immediately execute the particular menu or option. That is, if there is no response from the user, the controller 180 may automatically execute the function or menu by judging the non-response as a positive answer.

Generally, the error processing step S108 may be performed by again prompting and/or receiving input of a voice command, by displaying a plurality of menus having a recognition rate more than a certain level or a plurality of menus that may be judged to have similar meanings, etc. The user can then select one of the plurality of menus. Also, when the number of functions or menus having a recognition rate more than a certain level is less than a preset number (e.g., two), the controller 180 can automatically execute the corresponding function or menu.

Figure 6A:
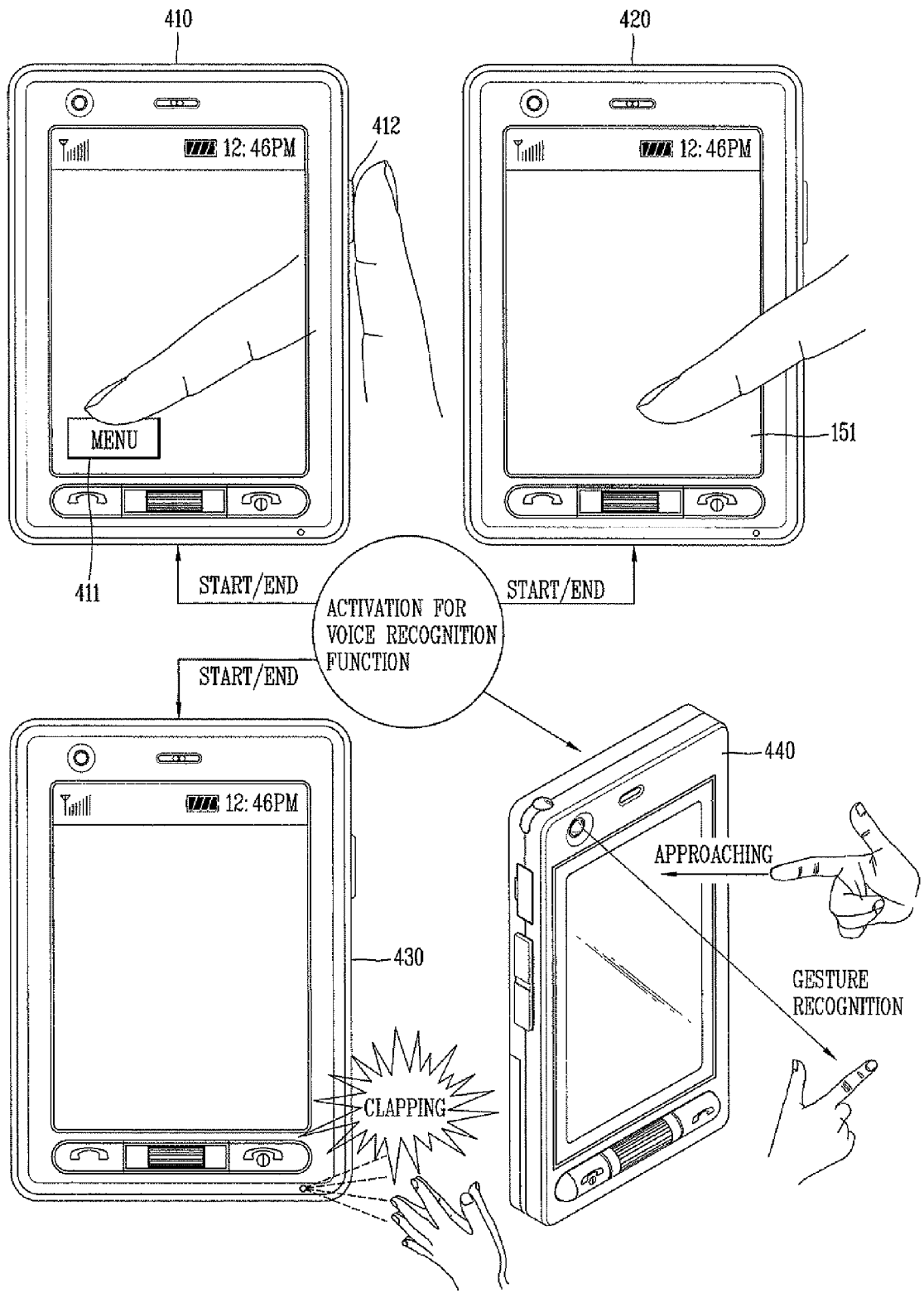
FIG. 6A is an exemplary view showing a method for activating a voice recognition function of a mobile terminal according to an embodiment of the present invention.

FIG. 6A is an overview showing a method for activating a voice recognition function for a mobile terminal according to an embodiment of the present invention. As shown in the display screen 410, a user may activate the voice recognition function by touching a soft button 411. The user can also terminate the voice recognition function by releasing the soft button 411. In more detail, the user can activate the voice recognition function by touching and continuing to press the soft button 411, or hard button 412, until the voice instruction has been completed. The user can release the soft button 411 or hard button 412 when the voice instruction has been completed. Thus, the controller 180 is made aware of when the voice instruction is to be input and when the voice instruction has been completed. As discussed above, because the user is directly involved in this determination, the accuracy of the interpretation of the input voice command may be increased.

The controller 180 can also be configured to recognize the start of the voice activation feature when the user first touches the soft button 411, and then recognize the voice instruction has been completed when the user touches the soft button 411 twice, for example. Other selection methods are also possible. Further, as shown in the display screen 410 in FIG 6A, rather than using the soft button 411, the voice activation and de-activation can be performed by manipulating a hard button 412 on the terminal.

In addition, the soft button 411 shown in the display screen 410 can be a single soft button that the user presses or releases to activate/deactivate the voice recognition function. Alternatively, soft button 411 may be a menu button that, when selected, produces a menu list such as "1.Start voice activation, and 2.Stop voice activation"). The soft button 411 can also be displayed during a standby state, for example.

In another example, and as shown in the display screen 420, the user can also activate and deactivate the voice recognition function by touching an arbitrary position of the screen. The display screen 430 illustrates yet another example in which the user activates and deactivates the voice recognition function by producing a specific sound or sound effects that is/are greater than a specific level. For example, the user may clap his or her hands together to produce such an impact sound.

Thus, according to an embodiment of the present invention, the voice recognition function may be implemented in two modes. For example, the voice recognition function may be implemented in a first mode for detecting a particular sound or sound effects greater than a specified level, and in a second mode for recognizing a voice command and determining a meaning of the voice command. If the sound or sound effects is/are greater than the specified level in the first mode, the second mode may be activated to thereby to recognize the voice command.

The display screen 440 illustrates still another method of the user activating and deactivating the voice recognition function. In this example, the controller 180 is configured to interpret body movements of the user to start and stop the voice activation function. For example, and as shown in the display screen 440, the controller 180 may be configured to interpret the user moving his hand toward the display as an instruction to activate the voice recognition function, and the user moving his hand away from the display as an instruction to terminate the voice activation function. Short or long-range wireless signals may also be used to start and stop the voice recognition function.

According to an embodiment of the present invention, because the voice activation function is started and stopped, the voice recognition function is not continuously executed. That is, when the voice recognition function is continuously maintained in the activated state, the amount of required resources on the mobile terminal would be increased compared to the embodiment of the present invention.

As discussed above with respect to FIG. 5, when the voice recognition function is activated, the controller 180 may specify a domain of a specific database that is used as a reference for voice command recognition to correspond to a domain relating to a menu list on the display 151. Then, if a specific menu is selected or executed from the menu list, the domain of the database may be specified to correspond to information relating to the selected menu or sub-menus of the specific menu.

Figure 6B:
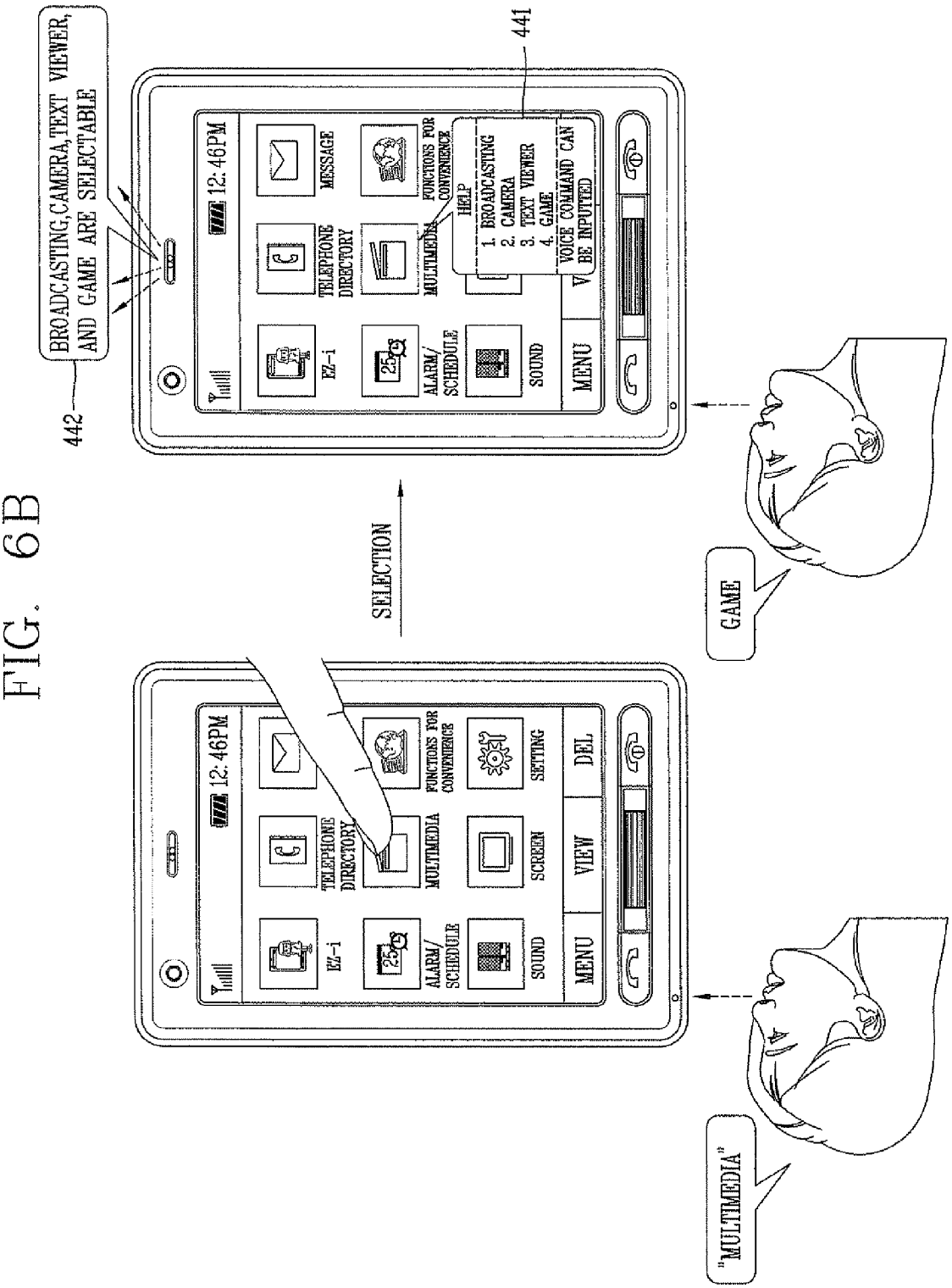
FIGS. 6B and 6C are exemplary views showing a method for outputting help information in a mobile terminal according to embodiments of the present invention.

When the specific menu is selected or executed through a voice command or touch input, the controller 180 may output help information relating to sub-menus of the specific menu in the form of a voice message, or pop-up windows or balloons. For example, as shown in FIG. 6B, when the user selects the 'multimedia' menu via a touching or voice operation, the controller 180 displays information relating to the sub-menus (e.g., broadcasting, camera, text viewer, game, etc.) of the 'multimedia' menu as balloon-shaped help information 441. Alternatively, the controller 180 can output a voice signal 442 including the help information. The user can then select one of the displayed help options using a voice command or by a touching operation.

Figure 6C:
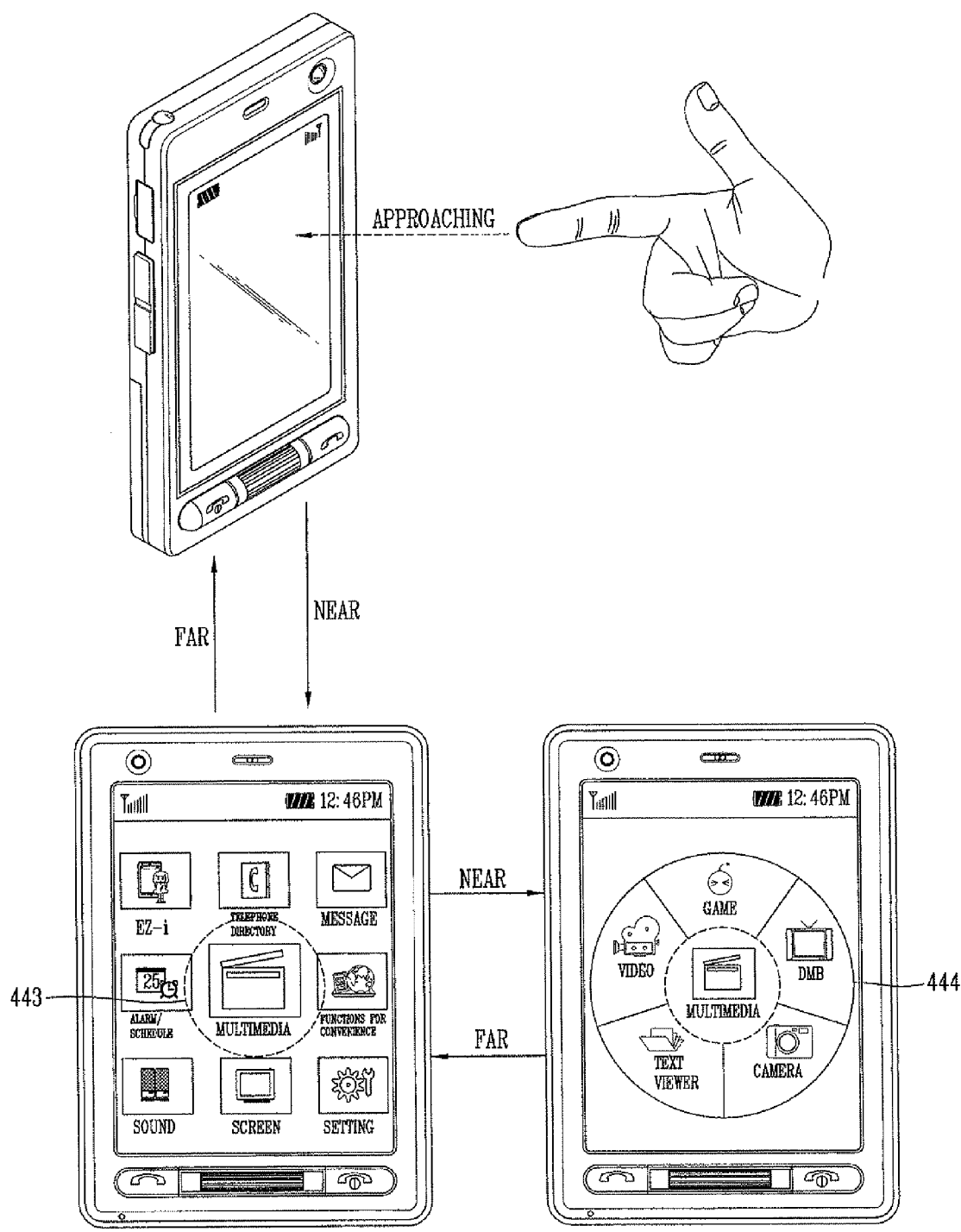

FIG. 6C illustrates an embodiment of a user selecting a menu item using his or her body movements (in this example, the user's hand gesture). As the user moves his or her finger closer to the menu item 443, the controller 180 displays the sub-menus 444 related to the menu 443. The controller 180 can recognize the user's body movement of information via the sensing unit 140, for example. In an embodiment, the displayed help information can be displayed so as to have a transparency or brightness controlled according to the user's distance. That is, as the user's hand gets closer, the displayed items can be further highlighted.

As discussed above, the controller 180 can be configured to determine the starting and stopping of the voice recognition function based on a variety of different methods. For example, the user can select/manipulate soft or hard buttons, touch an arbitrary position on the touch screen, etc. The controller 180 can also maintain the activation of the voice recognition function for a predetermined amount of time, and then automatically end the activation at the end of the predetermined amount of time. Also, the controller 180 may maintain the activation only while a specific button or touch operation is performed, and then automatically end the activation when the input is released. The controller 180 can also end the activation process when the voice command is no longer input for a certain amount of time.

Figure 7A:
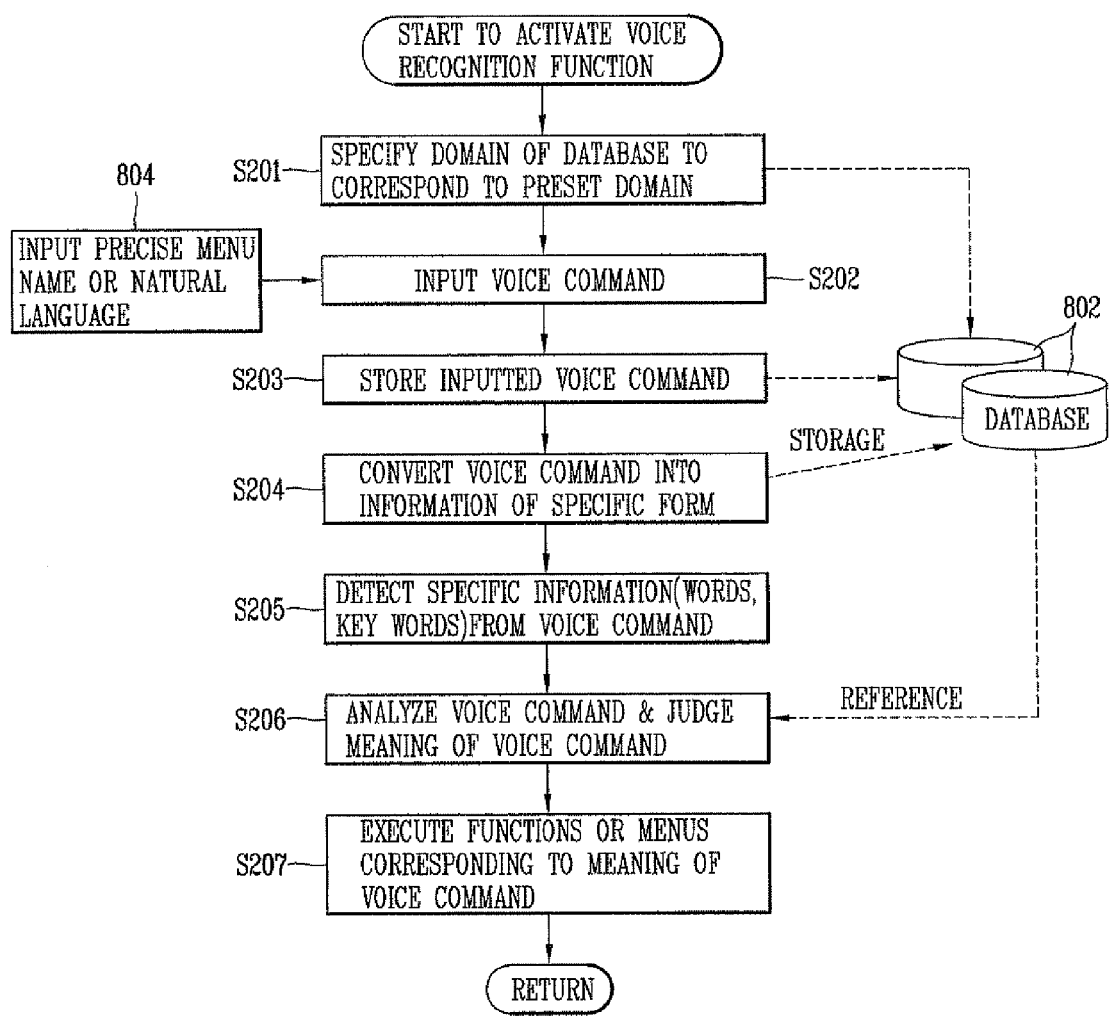
FIG. 7A is a flowchart showing a method for recognizing a voice command in a mobile terminal according to an embodiment of the present invention.

FIG. 7A is a flowchart showing a method for recognizing a voice command in a mobile terminal according to an embodiment of the present invention. Referring to FIG. 7A, when the voice recognition function is activated, the controller 180 specifies a domain of a database 802 that can be used as a reference for voice command recognition to correspond to a preset domain relating to a menu displayed on the display 151, sub-menus of the menu, or a currently-executed function or menu (S201). The user also may input the voice command (S202) using either the precise menu name or using a natural language (spoken English, for example) (block 804).

The controller 180 then stores the input voice command in the memory 160 (S203). Further, when the voice command is input under a specified domain, the controller 180 may analyze a context and content of the voice command based on the specified domain by using a voice recognition algorithm. The voice command may be converted into text-type information for analysis (S204), and then stored in a specific database 802 of the memory 160. However, the step of converting the voice command into text-type information can be omitted.

Then, to analyze the context and content of the voice command, the controller 180 may detect a specific word or keyword of the voice command (S205). Based on the detected words or keywords and using, the controller 180 analyzes the context and content of the voice command and determines or judges a meaning of the voice command by referring to information stored in the specific database (S206).

In addition, as discussed above, the database 802 used as a reference may include a specified domain (see S201), and functions or menus corresponding to a meaning of the voice command judged based on the specified database are executed (S207). For example, if it is assumed that text is input using an STT function after executing a 'text message' writing function, the priorities of such information for the voice command recognition may be set to commands related to modifying text or commands related to searching for a party to the call to receive the text message or transmission of such message. Also, because the database for voice recognition may be specified to each item of information relating to a currently-executed function or menu, the recognition rate and speed for recognizing the voice command may be improved, and the amount of resources used on the terminal may be reduced. Further, the recognition rate may indicate a matching degree with a name preset to a specific menu.

The recognition rate for an input voice command may also be determined by the number of items of information relating to specific functions or menus of the voice command. Therefore, the recognition rate for the input voice command may be improved when the information precisely matches a specific function or menu (e.g., menu name) included in the voice command.

Figure 7B:
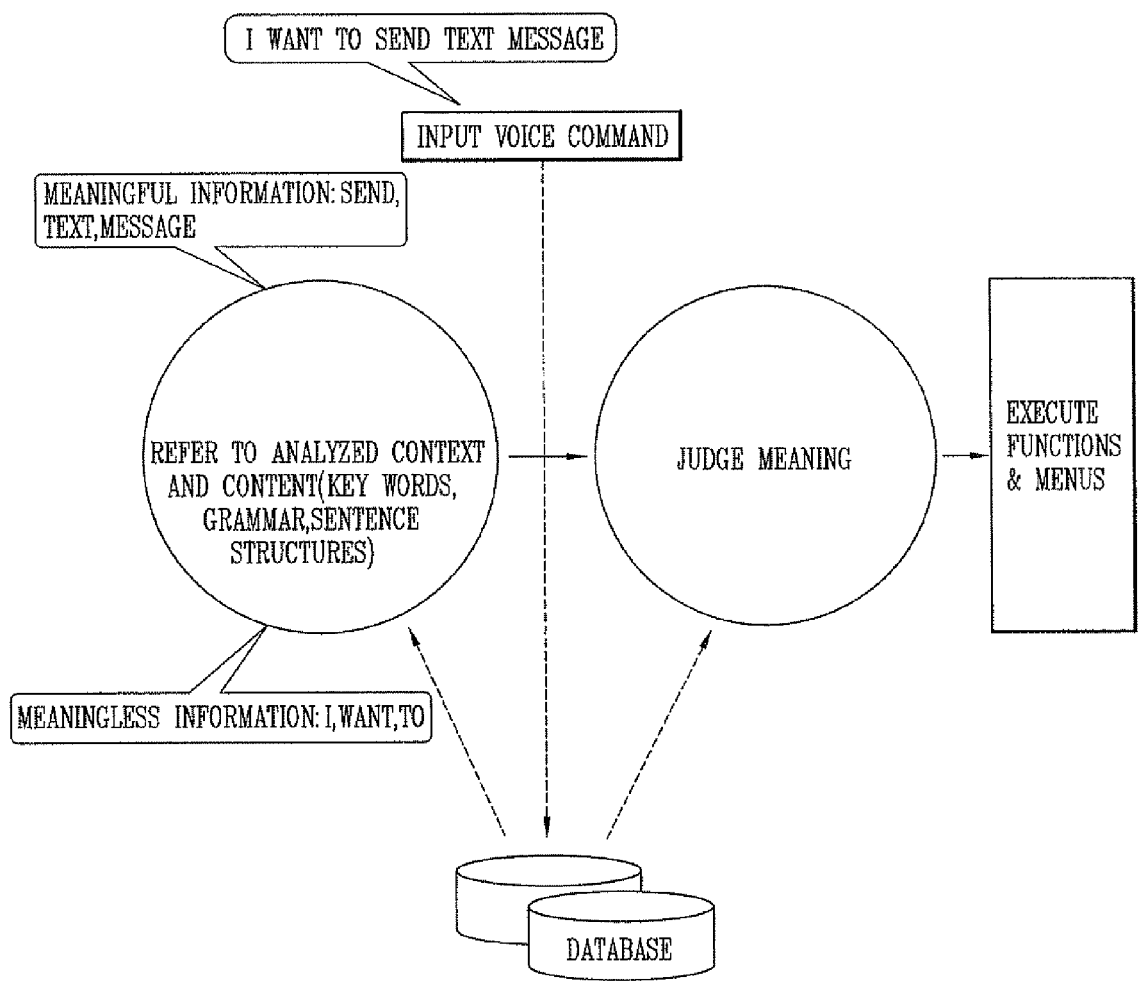
FIG. 7B is an exemplary view showing a method for recognizing a voice in a mobile terminal according to an embodiment of the present invention.

FIG. 7B is an overview showing a method for recognizing a voice command of a mobile terminal according to an embodiment of the present invention. As shown in FIG 7B, the user may input a voice command as a natural language composed of six words "I want to send text messages." In this example, the recognition rate can be judged based on the number of meaningful words (e.g., send, text, messages) relating to a specific menu (e.g., text message). In addition, the controller 180 may determine whether the words included in the voice command are meaningful words relating to a specific function or menu based on the information stored in the database. For instance, meaningless words included in the natural language voice command (e.g., I want to send text messages) that are irrelevant to the specific menu may include the subject ("I") or the preposition ("to").

The natural language may be processed by using a natural language processing algorithm. The natural language may or may not include a precise name relating to a specific menu, which may sometimes reduce the precision in recognizing a voice command. Therefore, according to an embodiment, when a voice command has a recognition rate greater than a specified level (e.g., 80%), the controller 180 determines the recognition to be precise.

When the controller 180 judges a plurality of menus to have similar meanings, in an embodiment, the controller 180 displays the plurality of menus and the user can select one of the displayed menus to have its functions executed. In addition or alternatively, a menu having a relatively higher recognition rate may be displayed first or distinctively displayed compared to the other menus.

Figure 8:
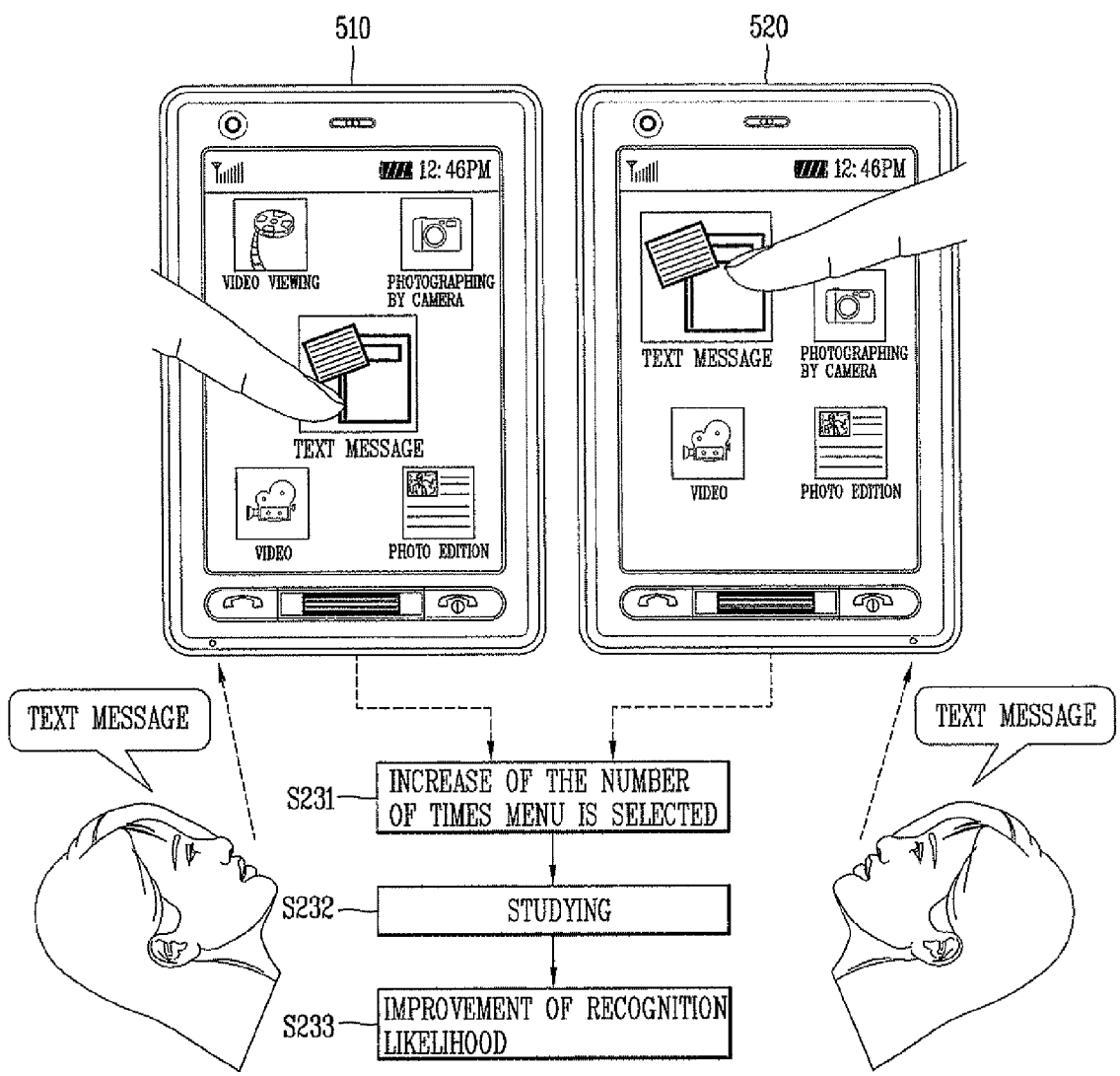
FIG. 8 is an exemplary view showing a method for displaying a menu in cooperation with a rate of voice recognition in a mobile terminal according to an embodiment of the present invention.

FIG. 8 is an overview showing a method for displaying menus for a voice recognition rate of a mobile terminal according to an embodiment of the present invention. As shown in FIG. 8, a menu icon (e.g., the "text message" menu icon) having a higher recognition rate is displayed at a central portion of the display screen 510, or may be displayed with a larger size or a darker color as shown in the display screen 520. The menu icon having the higher recognition rate can also be displayed first and then followed in order or sequential manner by lower recognition rate menus.

The controller 180 may distinctively display the plurality of menus by changing at least one of the size, position, color, brightness of the menus or by highlighting in the order of a higher recognition rate. The transparency of the menus may also be appropriately changed or controlled.

In addition, as shown in the lower portion of FIG. 8, a menu having a higher selection rate by a user may be updated or set to have a recognition rate. That is, the controller 180 may store a history of the user selections (S231) and may perform a learning process (S232) to thereby update a particular recognition rate for a menu option that is selected by a user more than other menu options (S233). Thus, the number of times a frequently used menu is selected by a user may be applied to adjust the overall recognition rate of the menu. Therefore, a voice command input in the same or similar manner in pronunciation or content may have a different recognition rate according to how many times a user selects a particular menu.

Further, the controller 180 may also store times at which the user performs particular functions. For example, a user may check emails or missed messages every time he or she wakes up on Mondays through Fridays. This time information may also be used to improve the recognition rate. The state of the terminal (e.g., standby mode, etc.) may also be used to improve the recognition rate. For example, the user may check emails or missed messages when first turning on their mobile terminal, when the terminal is opened from a closed position, etc.

Figure 9:
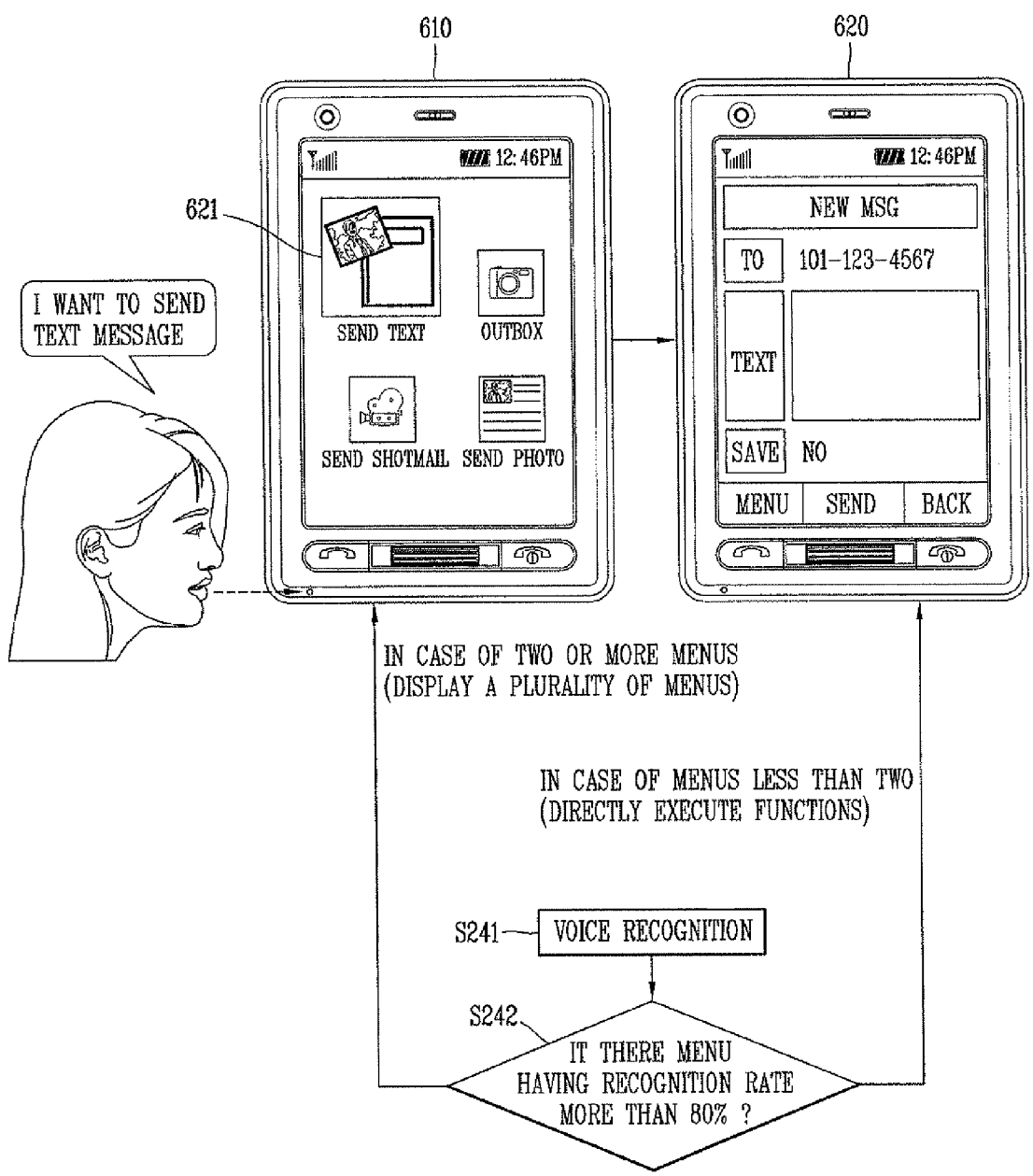
FIG. 9 is an exemplary view showing a method for recognizing a voice command in a mobile terminal according to an embodiment of the present invention.

FIG. 9 is an overview showing a method for recognizing a voice command of a mobile terminal according to another embodiment of the present invention. As shown in FIG 9, the user may activate the voice recognition function, and inputs the voice command "I want to send text messages." The controller 180 may then specify a domain of a database for voice command recognition into a domain relating to the displayed sub-menus. The controller 180 may then interpret the voice command (S241) and in this example, may display a plurality of menus that have a probability greater than a particular value (e.g., 80%) (S242). As shown in the display screen 610, the controller displays four multimedia menus.

The controller 180 may also distinctively display a menu having the highest probability (e.g., specific menu option 621 "Send Text" in this example). The user can then select any one of the displayed menus to execute a function corresponding to the selected menu. In the example shown in FIG. 9, the user selects the Send Text menu option 621 and the controller 180 displays sub menus related to the selected Send Text menu option 621 as shown in the display screen 620.

Also, as shown in step (S402) in the lower portion of FIG. 9, the controller 180 can also immediately execute a function when only a single menu is determined to be higher than the predetermined probability rate. That is, the controller 180 displays the information related to the text sending as shown in the display screen 620 immediately without the user having to select the Send Text menu option 621 when the Send Text menu option 621 is determined to be the only menu that has a higher recognition rate or probability than a predetermined threshold.

Like in the embodiment discussed above with respect to FIG. 6B, when a specific menu is selected or executed through a voice command or touch input according to an operation state or mode (e.g., a mode for indicating a voice recognition function), the controller 180 can also output balloon-shaped help information related to the sub menus to the user in a voice or text format. In addition, the user can set the operation mode for outputting the help using appropriate menu options provided in environment setting menus. Accordingly, a user can operate the terminal of the present invention without requiring a high level of technical skill. With the terminal of the present invention, a user who is generally not familiar with the intricacies of the user interfaces provided with the terminal can easily operate the mobile terminal.

In addition, when the controller 180 recognizes the voice command to have a plurality of meanings (e.g., when a natural language voice command such as "I want to send text messages" does not include a precise menu name such as when a menu is included in a 'send message' category but does not have a precise name among 'send photo', 'send mail', and 'outbox'), the controller 180 may display a plurality of menus having a recognition rate more than a certain value (e.g. 80%).

Figure 10:
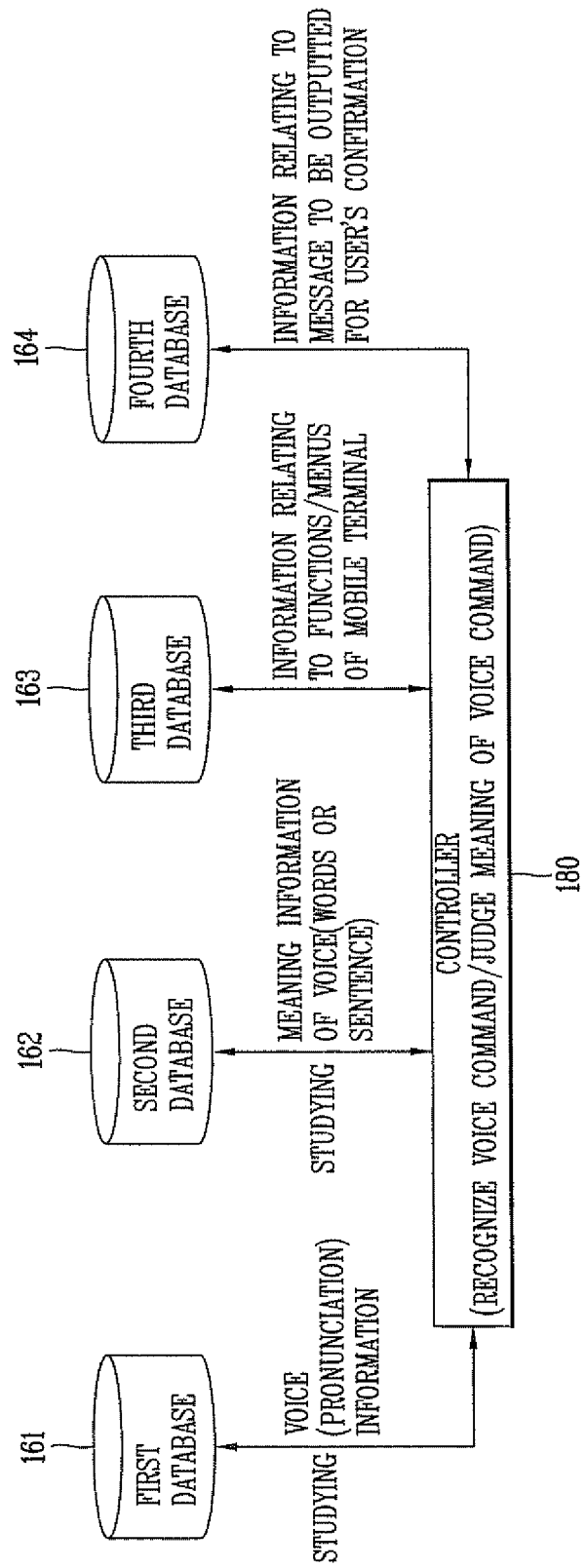
FIG. 10 is an exemplary view showing a construction of a database for recognizing a voice command in a mobile terminal according to an embodiment of the present invention.

FIG. 10 is a conceptual diagram of a plurality of databases used by the controller 180 for recognizing a voice command of a mobile terminal according to an embodiment of the present invention. In this embodiment, the databases store information that the controller 180 uses to judge a meaning of a voice command, and may be any number of databases according to information features. The respective databases configured according to information features may be updated through a continuous learning process under control of the controller 180.

The learning process may be configured to attempt to match a user's voice with a corresponding word. For example, when a word "waiting" pronounced by a user is misunderstood as a word "eighteen", the user corrects the word "eighteen" into "waiting". The same pronunciation to be subsequently input by the user is consequently set to be recognized as "waiting".

As shown in FIG. 10, the respective databases according to information features may include a first database 161, a second database 162, a third database 163, and a fourth database 164. In this embodiment, the first database 161 may store voice information for recognizing a voice input through the microphone in units of phonemes or syllables, or morphemes. The second database 162 may store information (e.g., grammar, pronunciation precision, sentence structure, etc.) for judging an entire meaning of a voice command based on the recognized voice information. The third database 163 may store information relating to menus for functions or services of the mobile terminal, and the fourth database 164 may store a message or voice information to be output from the mobile terminal so as to receive a user's confirmation about the judged meaning of the voice command.

The third database 163 may be identified to correspond to information relating to menus of a specific category according to a domain preset for voice command recognition. The respective database may store sound (pronunciation) information, and phonemes, syllable, morphemes, words, keywords, or sentences corresponding to the pronunciation information. Accordingly, the controller 180 may determine or judge the meaning of a voice command by using at least one of the plurality of databases 161 to 164, and execute menus relating to functions or services corresponding to the judged meaning of the voice command.

Also, an operation state or mode having the voice command recognition function or STT function applied thereto may be displayed using a specific or distinctive shape of indicator or icon. So, upon the output of the indicator or icon, the user can be notified that the specific operation state or mode corresponds with the voice recognition function.

Hereinafter a method is disclosed for executing a specific menu through a voice command by using the voice command recognition function, and for sharing information output from the executed menu with a party to the call.

Figure 11:
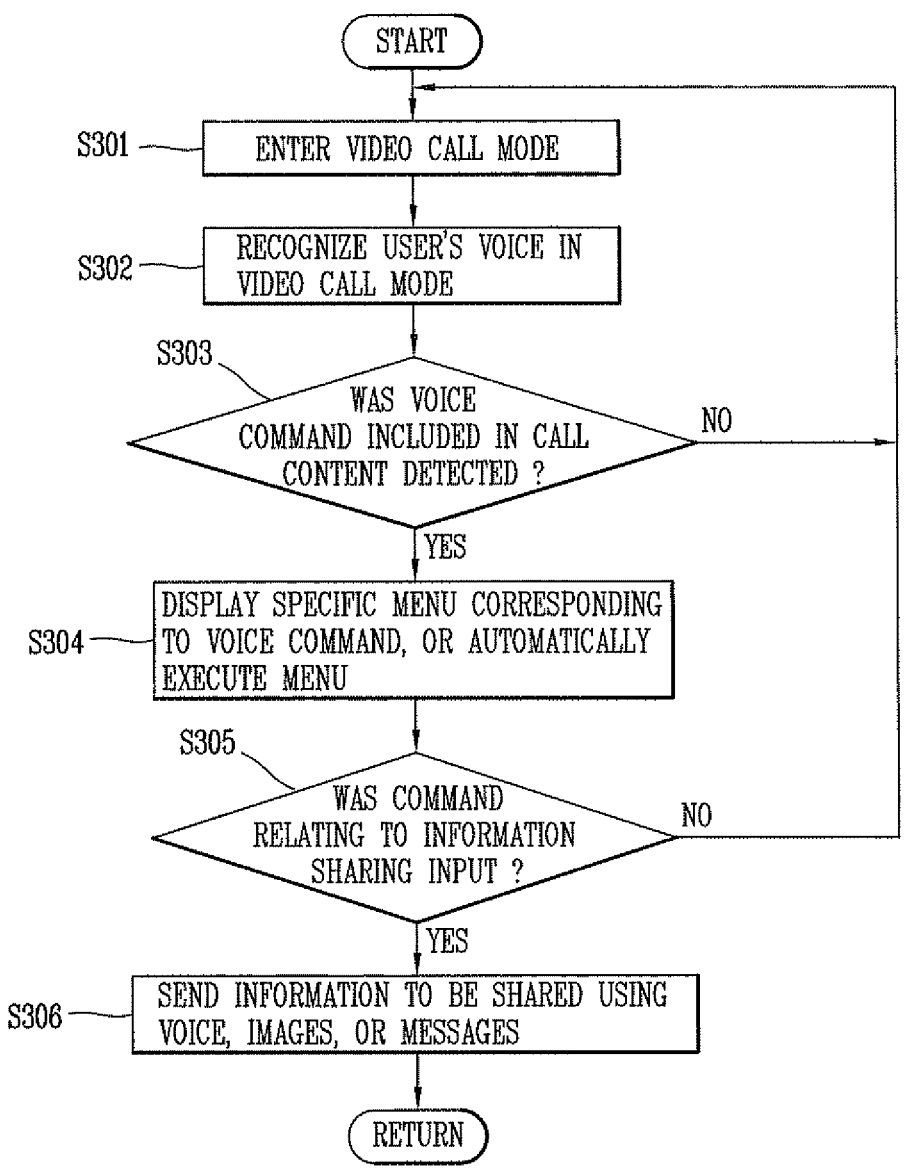
FIG. 11 is a flowchart showing a method for executing a menu through a voice command in a call mode of the mobile terminal according to an embodiment of the present invention.

FIG. 11 is a flowchart showing a method for executing a menu through a voice command in a call mode of the mobile terminal according the present invention. The method may be applied not only to video calls, but also to voice calls. However, it is assumed that the method is applied to video calls for convenience.

Generally, the controller 180 may execute a video call function of the mobile terminal based on a command input from a user. For multi-calling, the controller 180 may add parties with whom the user is to perform a video call to a party list. The process for adding a party may be performed before a video call or during a video call.

Images of a participating party to the video call may be displayed on the display 151, and alternative still or moving images may be displayed instead of the party's images. Text-type information relating to the party may be additionally displayed along with the calling party's images. Here, the party's information may be displayed by using information registered in a phone book, or may be displayed by using information arbitrarily input by a user.

The command may be input through keys, touch, approach, gesture, pressure, or voice. Hereinafter, it is assumed that voice commands are input, for convenience.

Firstly, the mobile terminal enters a video call mode (S301).

Then, the controller 180 recognizes a user's voice from call content input in a video call mode (S302). A determination is made whether a voice command is included in the call content (S303). If so, the voice command is preset in a specific database.

A specific menu corresponding to the voice command is displayed or automatically executed (S304). Whether to display or automatically execute the specific menu may be determined by an option preset in an environment setting menu of the mobile terminal.

The voice command may include a name of a specific function or a specific menu of the mobile terminal, or a keyword relating to the specific menu may be used. In the latter case, keyword relating to a specific menu such as 'music', 'texts' and 'moving images' may be used as the voice command. Multiple keywords may be assigned to one specific menu.

The controller 180 may divide the display 151 into a plurality of display regions, and may display the specific menu or an execution screen for the specific menu on one of the display regions. The controller 180 may display the specific menu, or the execution screen for the specific menu in the form of an additional window, and then overlay on a screen for the video call. Here, the specific menu may be displayed in the form of icons or texts.

In an embodiment, information output from the executed specific menu may be shared with a party to the call. The specific information includes music, moving images, photos, and texts.

The controller 180 may receive an information sharing command from a user so as to share the specific information with a party to the call. The information to be shared with a party may be transmitted in real time, through a voice call channel or a video call channel, according to whether or not it is being currently replayed or output. That is, the user can share the specific information without additionally reproducing a menu.

For instance, a determination may be made as to whether a command about information sharing is input (S305). Here, if the information corresponds to image information, the controller 180 may send the information to be shared to a party to the call, in the form of still or moving images, through a video call channel (S306). If the information to be shared is sound information such as music, the controller 180 may send the information to be shared in real time by synthesizing with the current user's voice. If the information to be shared is not currently being played, the controller 180 may send the information to be shared to a party in the form of a file using one or more functions to send messages such as an SMS, an MMS or an E-mail.

In an embodiment, a specific menu may be directly executed through a voice command in a call mode, or specific information output from the executed menu may be directly shared with a party. For instance, music, texts, moving images, or photos may be shared with a party in a call mode, and call content relating to them may be implemented.

Hereinafter, a method for executing a video call function will be explained in more detail.

Figure 12:
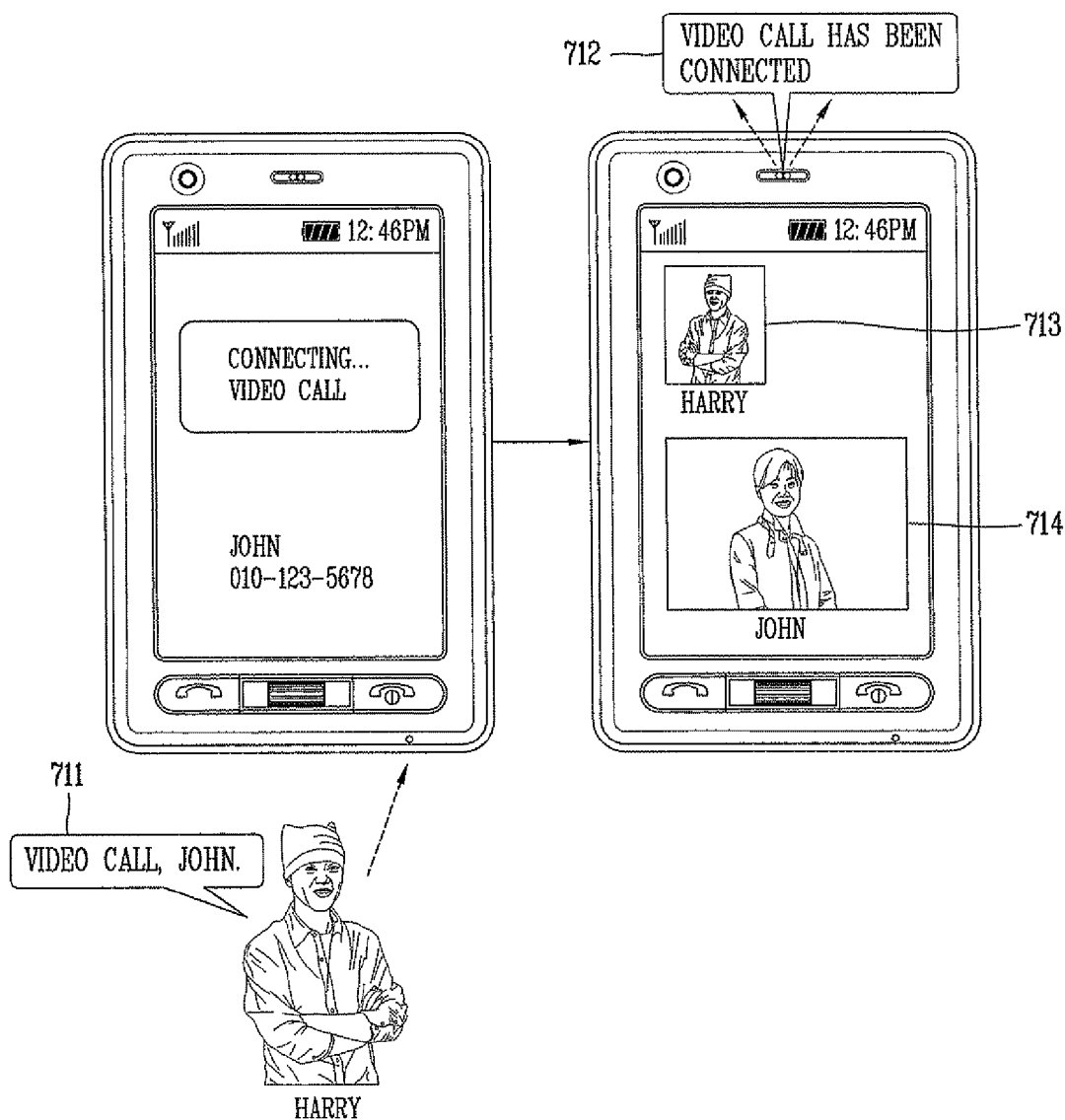
FIG. 12 is an exemplary view showing a video call function of the mobile terminal according to an embodiment of the present invention.

FIG. 12 is an exemplary view of a display screen showing a video call function of the mobile terminal according to an embodiment the present invention. In this preferred embodiment, a video call or a voice call may be performed among three or more calling parties. However, it is assumed that two calling parties participate in a call for convenience.

A user may execute a video call function through a voice command. Once a specific voice command (e.g., "video call") relating to a 'video call function' is input from a user, the controller 180 recognizes the voice command 711 and executes a 'video call function' in response. Then, the controller 180 may execute a video call connection with a specific party (e.g., JOHN) designated by a user. Once the video call connection has been executed, the controller 180 may output an audible message 712 indicating that the video call has been connected. On a screen for the video call, a user's images 713 or a party's images, each participating in a video call, may be displayed. Here, instead of the user's images or the party's images, alternative still or moving images may be displayed. The position and size of the respective images 713 and 714 may be changed.

If name information consistent with a specific function or a specific menu is included in the voice command, a recognition rate for the voice command may be improved and the overall amount of processing resources used by the mobile terminal decreased accordingly.

The voice command is not limited to the menu name. A natural language command may be input to operate a video call function. For instance, a user may input a voice command as a natural language composed of a plurality of words "I want to start a video call." In this example, the recognition rate for the voice command input as a natural language can be judged based on the number of meaningful words (e.g., start, video, call) relating to a specific menu (e.g., video, call).

In addition, the controller 180 can determine whether the words included in the voice command are meaningful words relating to a specific function or menu based on meaning-related information or grammar-related information. For instance, meaningless words included in the natural language voice command (e.g., 'I want to start a video call.') that are irrelevant to the specific menu may be the subject (I) or the preposition (to).

Hereinafter will be explained a method for detecting a voice command from a user's call content in a video call mode.

Figure 13:
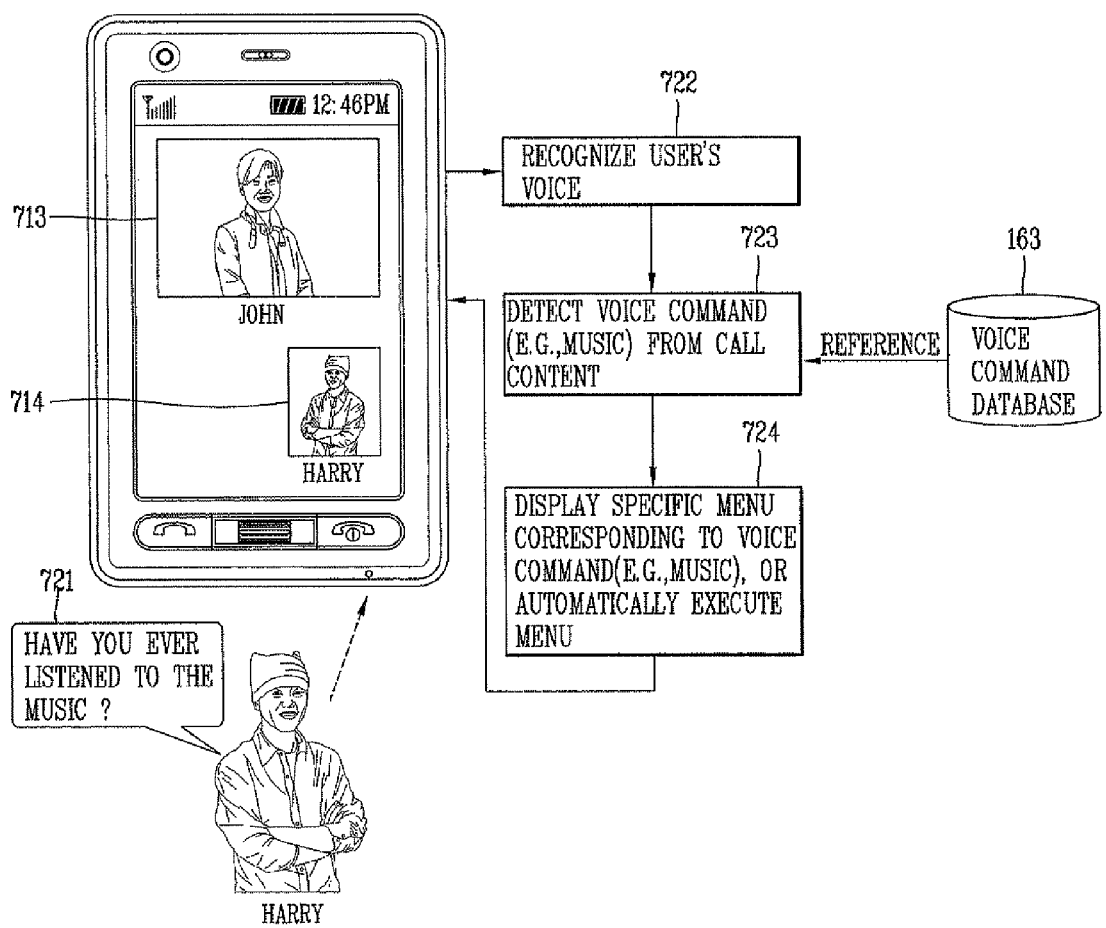
FIG. 13 is an exemplary view showing a method for detecting a voice command from call content in a video call mode of the mobile terminal according to an embodiment of the present invention.

FIG. 13 is an exemplary view showing a method for detecting and distinguishing a voice command from call content in a video call mode of the mobile terminal according to the present invention.

In order to distinguish a voice command from general call content among the entire call content input in a video call mode, the controller 180 may activate a voice recognition function during the video call. The voice command may be stored in another database 163. A database for storing the voice command, or keywords to be used as the voice command may be additionally implemented.

The controller 180 recognizes a user's voice command from call content input through the microphone 122 (722). Then, the controller 180 compares the recognized voice command with the voice command stored in the database 163. Through the comparison process, the controller 180 detects a voice command included in the call content (723).

For instance, a sentence spoken by a user in a call mode, such as 'Have you ever listened to the music?' may be detected (721). If the 'music' among the entire call content is a preset voice command, the controller 180 compares the call content with the voice commands stored in the database 163, thereby detecting the corresponding voice commands (e.g., music) included in the call content.

The controller 180 may display a specific menu corresponding to the voice command on the display 151, or may automatically execute the specific menu according to an option preset through an environment setting menu (724).

Hereinafter, a method for displaying the specific menu will be explained.

Figure 14:
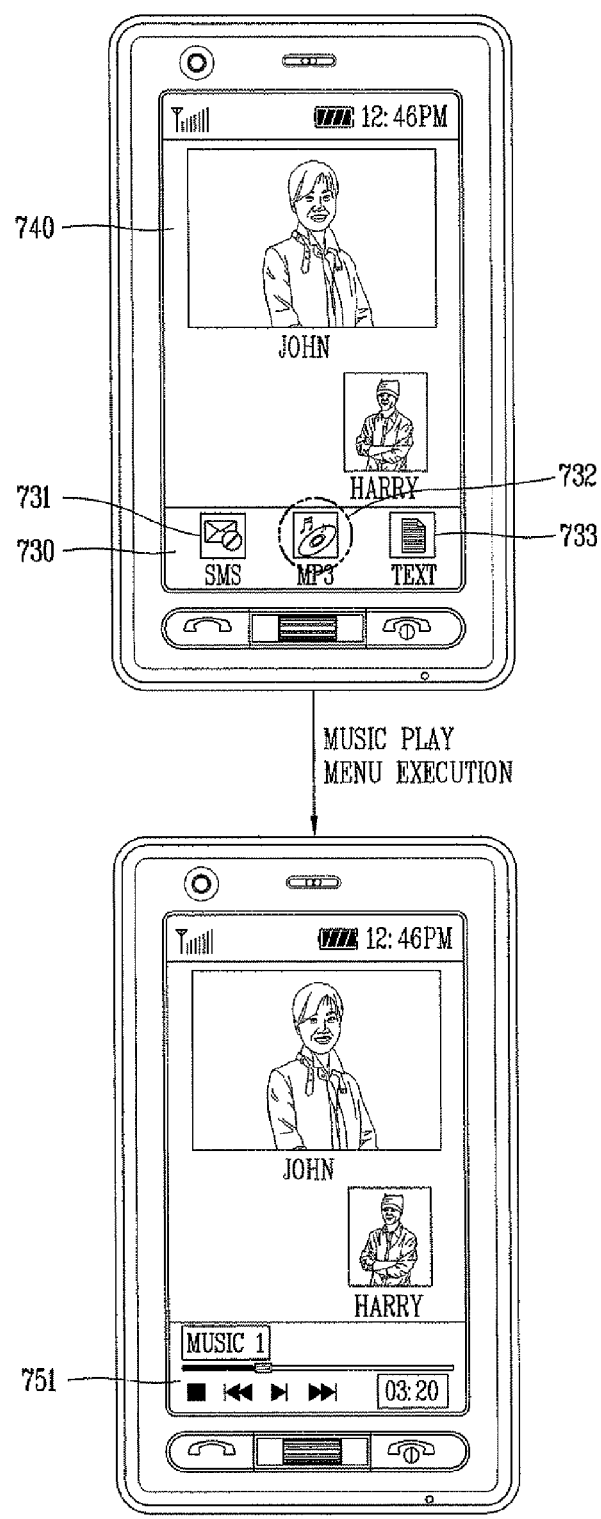
FIG. 14 is an exemplary view showing a method for displaying a menu corresponding to a voice command detected in a video call mode of the mobile terminal according to an embodiment of the present invention.

FIG. 14 is an exemplary view of a display screen showing a method for displaying a menu corresponding to a voice command detected in a video call mode of the mobile terminal according to an embodiment of the present invention. Once a voice command is detected from call content in a video call mode, the controller 180 displays menus 731, 732 and 733 corresponding to the voice command at one side 730 of the display region. Here, the menu may be displayed in the form of icons, texts or other symbols.

If a plurality of voice commands are detected from the call content, the controller 180 may sequentially display menus 731-733 corresponding to the voice commands according to a detected order.

Once the menus 731-733 are displayed, a user may select at least one of the menus for direct execution. The menus corresponding to the detected voice command may be automatically executed by the controller 180. Once a specific menu corresponding to a voice command is executed, the controller 180 may display an execution screen 751 corresponding to the specific menu on one side of the display region. For instance, the controller 180 may display the execution screen 751 on one side of the display region in an overlaying manner, or on one display region between two display regions 730 and 740.

Instead of the user's images or the party's images in a call mode, the menu execution screen may be displayed.

Figure 15A:
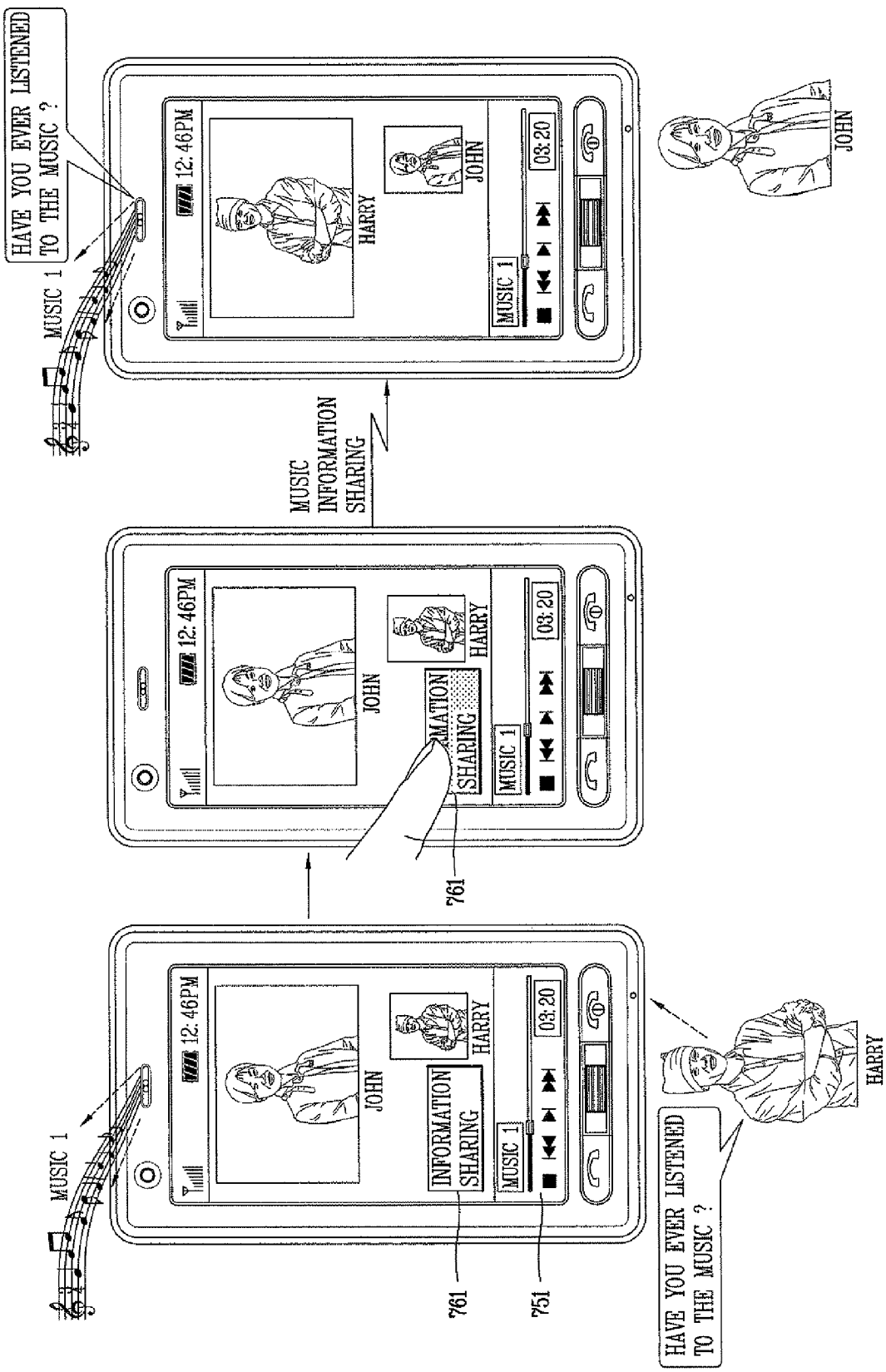
FIGS. 15A and 15B are exemplary views showing a method for sharing specific information with a party to the call in a video call mode of the mobile terminal according to embodiments of the present invention.
Figure 15B:
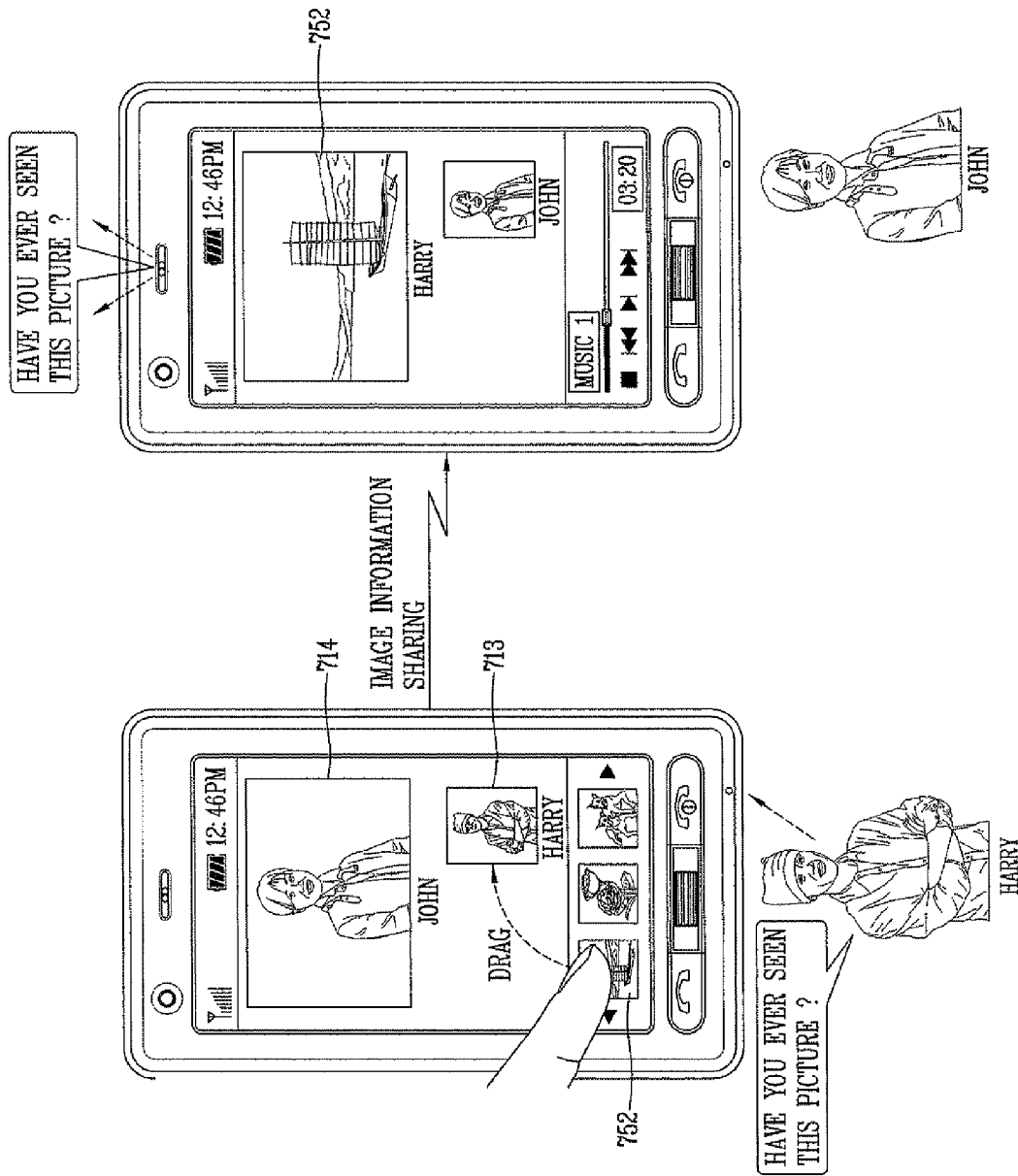

FIGS. 15A and 15B are exemplary views showing a method for sharing information with a party to the call in a video call mode of the mobile terminal according to an embodiment the present invention.

In an embodiment, a menu (e.g., multimedia play, text viewer) may be executed in a video call mode, and specific information output from the executed specific menu may be shared with a party. The specific information includes music, moving images, photos, and texts.

For sharing the specific information, the controller 180 may display a menu 761 indicating 'information sharing'. The menu 761 may be displayed in the form of icons or buttons, etc.

As shown in FIG. 15A, once a user (HARRY) activates the menu 761, the controller 180 may send information (e.g., MUSIC 1) being currently output to the execution screen 751 for the menu 761, to a party to the call (JOHN). Or, as shown in FIG. 15B, specific information (e.g., images or text) displayed on the execution screen 751 for the menu 761 may be instructed to be shared in a drag and drop manner, as shown with reference to image 752.

Referring back to FIG. 15A, music (MUSIC 1) being currently output to a music playing screen may be sent to the party together with the user's voice. Alternatively, referring to FIG. 15B, once the user drags texts or images 752 displayed on the screen, the dragged texts or images 752 rather than the user's images 713 may be sent to the party (e.g. JOHN).

Alternatively, an entire file may be sent to the party. For instance, a music file being currently played, or a text file being currently displayed may be entirely sent to the party. Here, the controller 180 may utilize a function to send messages (e.g., SMS, MMS, and E-mail) so as to send the file.

The various embodiments discussed above may be implemented in a computer-readable medium using, for example, computer software, hardware, or some combination thereof. For a hardware implementation, the embodiments described above may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof For a software implementation, the embodiments described herein may be implemented with separate software modules, such as procedures and functions, each of which may perform one or more of the functions and operations described herein. The software codes can be implemented with a software application written in any suitable programming language and may be stored in memory (for example, the memory 160), and executed by a controller or processor (for example, the controller 180).

In addition, the mobile terminal 100 may be implemented in a variety of different configurations. Examples of such configurations include a folder-type, slide-type, bar-type, rotational-type, swing-type and combinations thereof.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a microphone configured to receive a user's voice during a video call;
    a display configured to display information;
    an input unit configured to receive a user input; and
    a controller configured to:
        initiate the video call with a call recipient in response to a first input via the input unit;
        activate a voice recognition function during the video call in response to a second input via the input unit;
        receive, during the video call, an input comprising a natural language conversation of a user of the mobile terminal with the call recipient;
        convert the natural language conversation into text format;
        detect, during the video call, a voice command from the text format of the natural language conversation,
        wherein the natural language conversation comprises one or more words which form the voice command and one or more additional words which do not form the voice command;
        control the display to display a menu associated with the detected voice command in response to detecting the voice command;
        execute a function associated with the displayed menu;
        control the display to display an icon for sharing information associated with the executed function;
        transmit the information associated with the executed function to the call recipient in response to the user dragging the icon to a specific region displayed on the display; and
        control the display to sequentially display menus associated with each of a plurality of detected voice commands.

2. The mobile terminal of claim 1, wherein the controller is further configured to detect the voice command by comparing words that are spoken by the user during the natural language conversation with a voice command stored in a database.

3. The mobile terminal of claim 1, wherein the controller is further configured to control the display to display an execution menu associated with the executed function.

4. The mobile terminal of claim 3, wherein the controller is further configured to:
    control the display to display a plurality of display regions; and
    control the display to display the menu associated with the detected voice command or the execution menu in one of the display regions.

5. The mobile terminal of claim 3, wherein the controller is further configured to control the display to display the menu associated with the detected voice command or the execution menu in a window that is separate from the information displayed on the display.

6. The mobile terminal of claim 1, wherein:
    the information comprises sound; and
    the controller is further configured to transmit the information associated with the executed function via a voice calling channel used during the video call.

7. The mobile terminal of claim 1, wherein:
    the information comprises an image or a video; and
    the controller is further configured to transmit the information associated with the executed function via a video call channel.

8. The mobile terminal of claim 7, wherein the controller is further configured to transmit the information associated with the executed function as a file.

9. A method for transmitting data from a mobile terminal, the method comprising:
    initiating a video call with a call recipient in response to a first input via an input unit;
    activating a voice recognition function during the video call in response to a second input via the input unit;
    receiving, during the video call, an input comprising a natural language conversation of a user of the mobile terminal with the call recipient;
    converting the natural language conversation into text format;
    detecting, during the video call, a voice command from the text format of the natural language conversation, wherein the natural language conversation comprises one or more words which form the voice command and one or more additional words which do not form the voice command;
    displaying, on a display of the mobile terminal, a menu associated with the detected voice command in response to detecting of the voice command;
    executing a function associated with the displayed menu;
    displaying, on the display, an icon for sharing information associated with the executed function;
    detecting a plurality of voice commands;
    sequentially displaying menus, on the display, in response to the detecting of the plurality of voice commands; and
    transmitting the information to the call recipient in response to the user dragging the icon to a specific region displayed on the display.

10. The method of claim 9, wherein the voice command is a word associated with the menu or a word associated with the function.

11. The method of claim 10 wherein the word associated with the menu is one of a plurality of words associated with the menu.

12. The method of claim 9, wherein executing the function further comprises displaying, on the display, an execution menu associated with the executed function.

13. The mobile terminal of claim 1, wherein the natural language conversation can be a language other than English.

14. The method of claim 9, wherein the natural language conversation can be a language other than English.

* * * * *